(12) United States Patent
Kamiguchi et al.

(10) Patent No.: US 6,348,274 B1
(45) Date of Patent: Feb. 19, 2002

(54) MAGNETORESISTIVE ELEMENT AND MAGNETIC RECORDING APPARATUS

(75) Inventors: Yuzo Kamiguchi; Hiromi Yuasa; Masashi Sahashi, all of Yokohama; Hitoshi Iwasaki, Yokosuka, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/472,144

(22) Filed: Dec. 27, 1999

(30) Foreign Application Priority Data

Dec. 28, 1998 (JP) .......................................... 10-377385

(51) Int. Cl.$^7$ ................................................ G11B 5/66
(52) U.S. Cl. ............... 428/692; 428/694 R; 428/694 T; 428/694 TS; 428/694 TN; 428/694 RL; 428/900; 360/113
(58) Field of Search ............................ 428/697, 654 R, 428/694 T, 694 TS, 694 TM, 694 RL, 300; 360/113

(56) References Cited

U.S. PATENT DOCUMENTS 5,949,622 A * 9/1999 Kamiguchi .................. 360/113

FOREIGN PATENT DOCUMENTS

| JP | 10-3620 | 1/1998 |
|---|---|---|
| JP | 10-261209 | 9/1998 |
| JP | 11-8424 | 1/1999 |

OTHER PUBLICATIONS

Egelhoff et al., "Oxygen As a Surfactant In The Growth of Giant Magnetoresistance Spin Valves," J. Appl. Phys. 82 (12), pp. 6142–6251, Dec. 1997.
Swagten et al., "Enhanced Giant Magnetoresistance in Spin–Valves Sandwiched Between Insulating NiO," Phys. Rev. B, vol. 53, No. 14, pp. 9108–9114, Apr. 1996.
Swagten et al., "Specular Reflection in Spin Valves Bounded by NiO Layers," IEEE Trans. Magn. vol. 34, No. 4, pp. 948–953, Jul. 1998.
Kamiguchi et al., "Giant Magnetoresistance and Soft Magnetic Properties of $Co_{90}Fe_{10}$/Cu Spin–Valve Structures," J. Appl. Phys, 79 (8), pp. 6399–6401, Apr. 1996.
Kamiguchi et al., "CoFe Specular Spin Valves With a Nano Oxide Layer," Digests of Intermag '99, DB–01, 1999.
Dieny et al., "Giant Magnetoresistance of Magnetically Soft Sandwiches: Dependence on Temperature and On Layer Thickness," The American Physical Society, Physical Review B, vol. 45, No. 2, pp. 806–813, Jan. 1992.
Dieny et al., "Magnetotransport Properties of Magnetically Soft Spin–Valve Structures (Invited)," J. Appl. Phys., vol. 69, No. 8, pp. 4774–4779, Apr. 1991.
Hunt, "A Magnetoresistive Readout Transducer," IEEE Transactions on Magnetics, vol. MAG–7, No. 1, pp. 150–154, Mar. 1971.
Kamiguchi, Yuzo et al., "Multi–Layered Thin–Film Function Device and Magnetoresistance Effect Element," U.S. Application No. 09/273,406, filed Mar. 22, 1999.

* cited by examiner

Primary Examiner—Leszek Kiliman
(74) Attorney, Agent, or Firm—Finnegan, Henderson, Farabow, Garrett & Dunner, L.L.P.

(57) ABSTRACT

A magnetoresistive element includes a pinned layer, free layer and non-magnetic spacer film between them. The pinned layer is made up of a first ferromagnetic metal layer, first non-metal layer on the first ferromagnetic metal layer, second non-metal layer on the first non-metal layer and different in composition from the first non-metal layer, and second ferromagnetic metal layer on the second non-metal layer. Thus, the magnetoresistive element, which may be used in a magnetic head of a magnetic recording apparatus, ensures a good bias property of the pinned film while maintaining a large MR changing rate of a specular spin valve structure, and it is simultaneously improved in soft magnetic property.

20 Claims, 8 Drawing Sheets

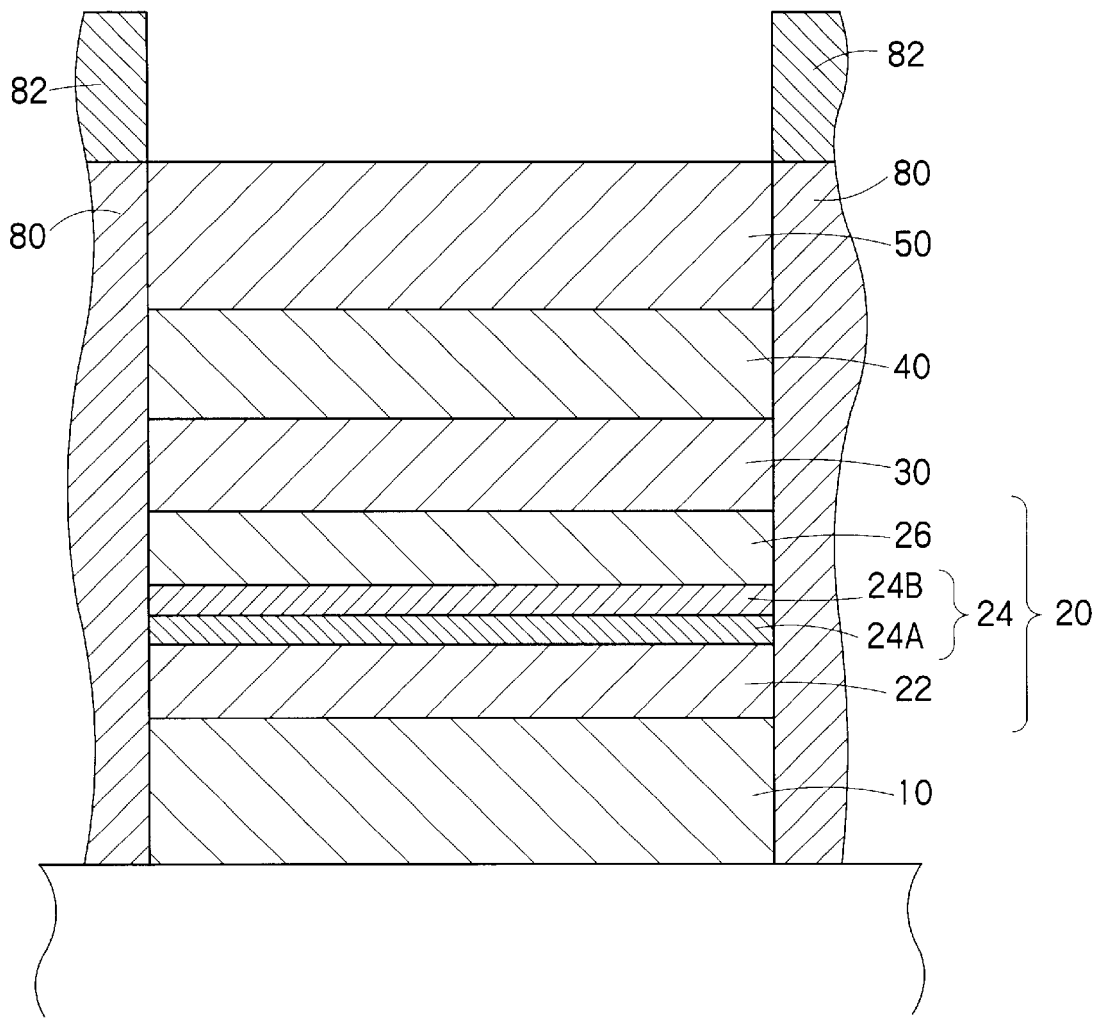
F I G. 1

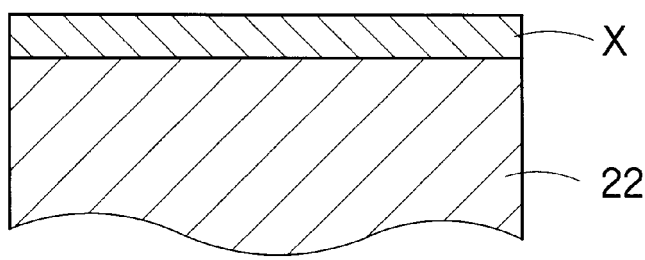
F I G. 2A
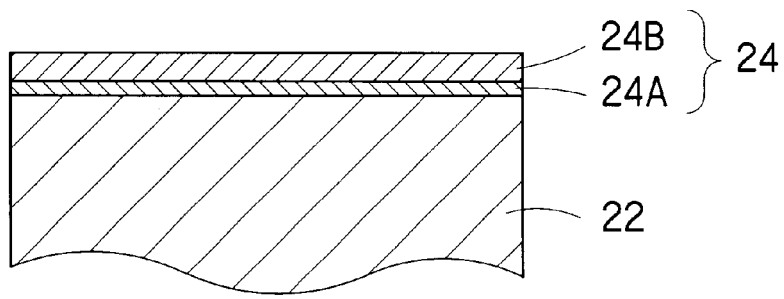
F I G. 2B
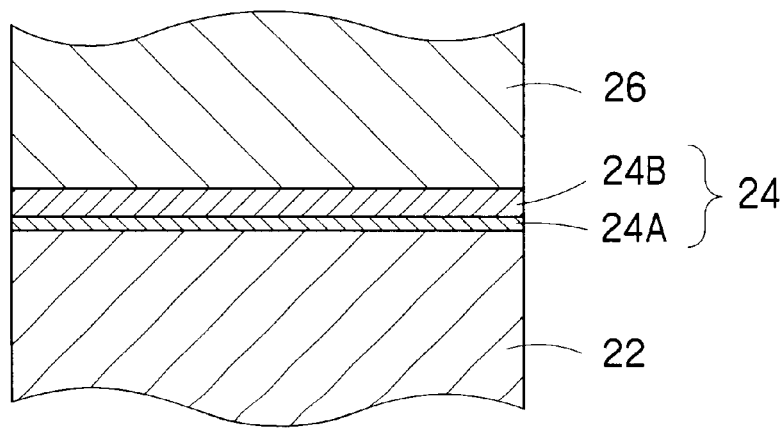
F I G. 2C

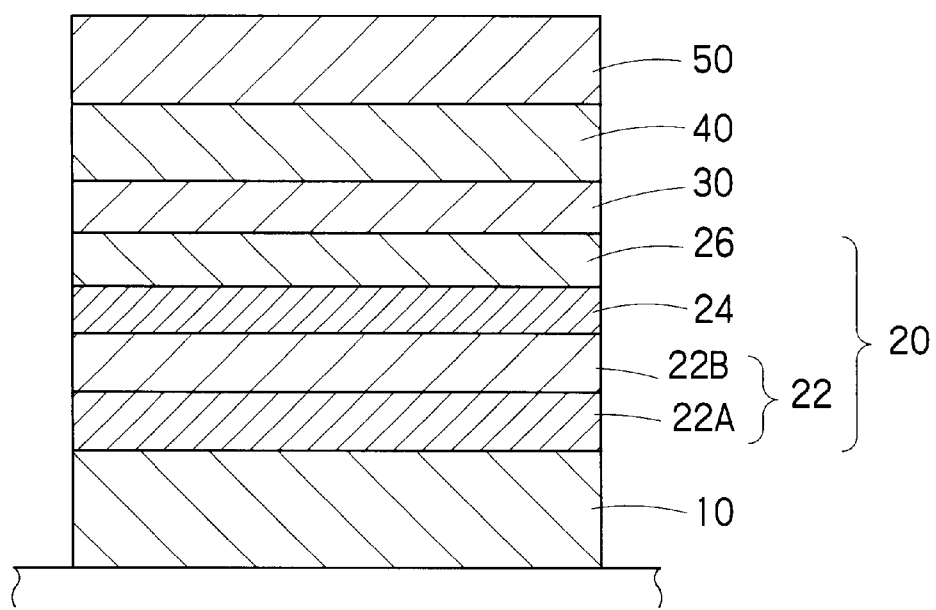
F I G. 3
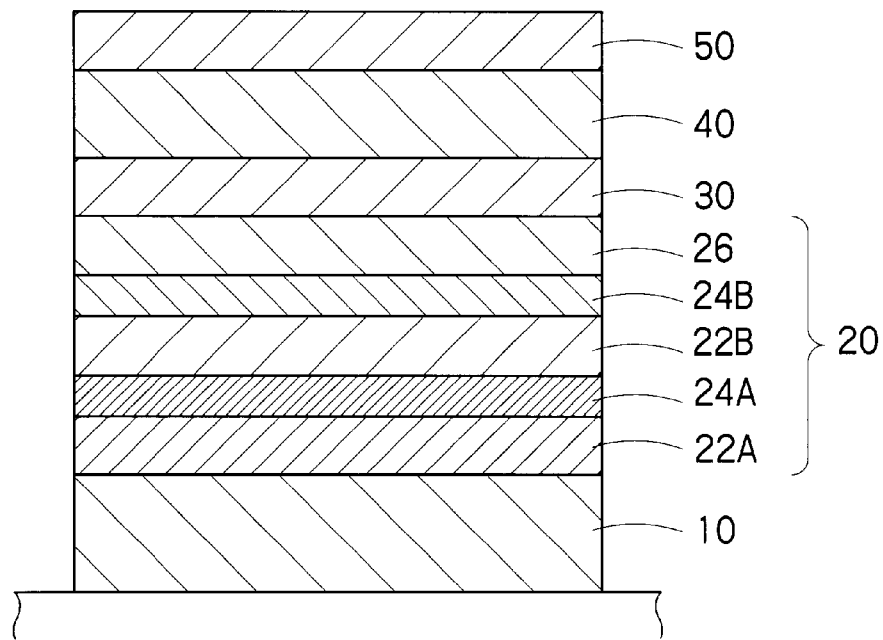
F I G. 4

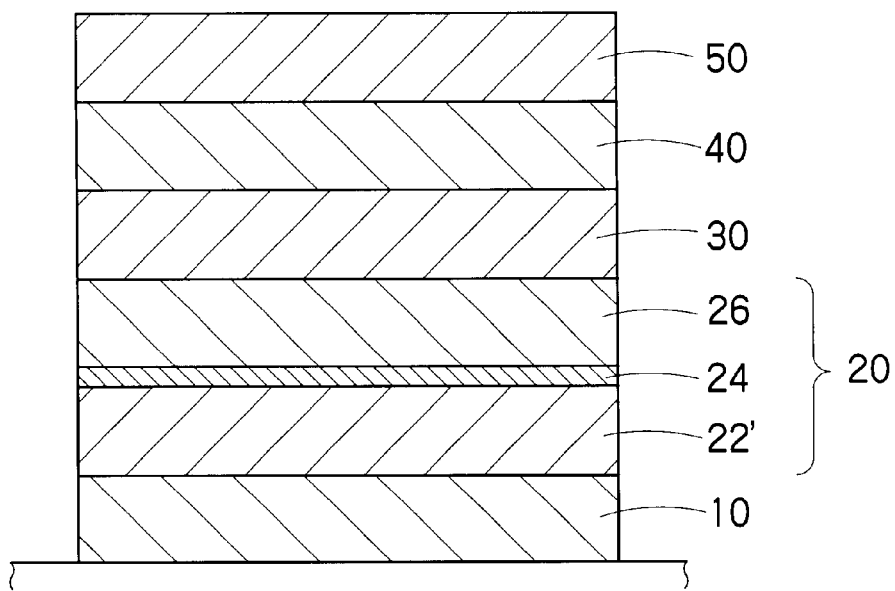
F I G. 5
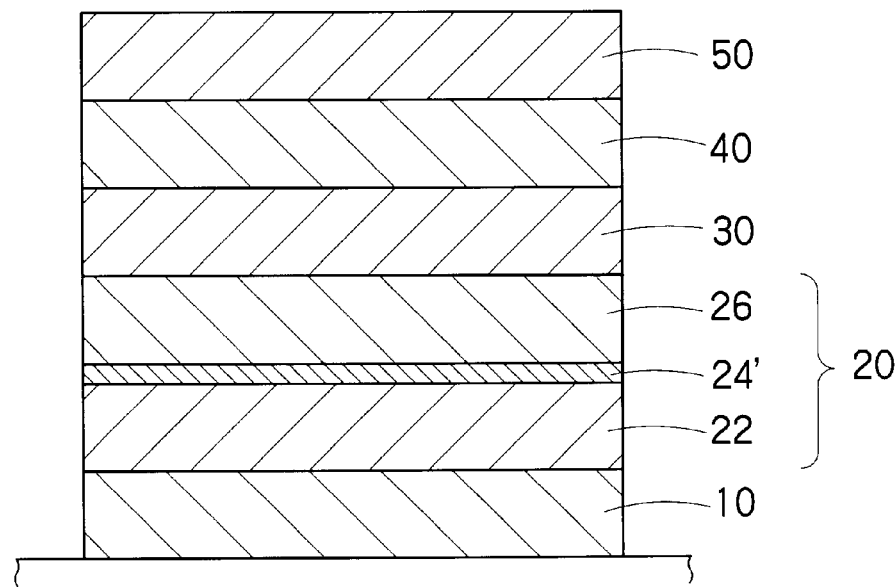
F I G. 6

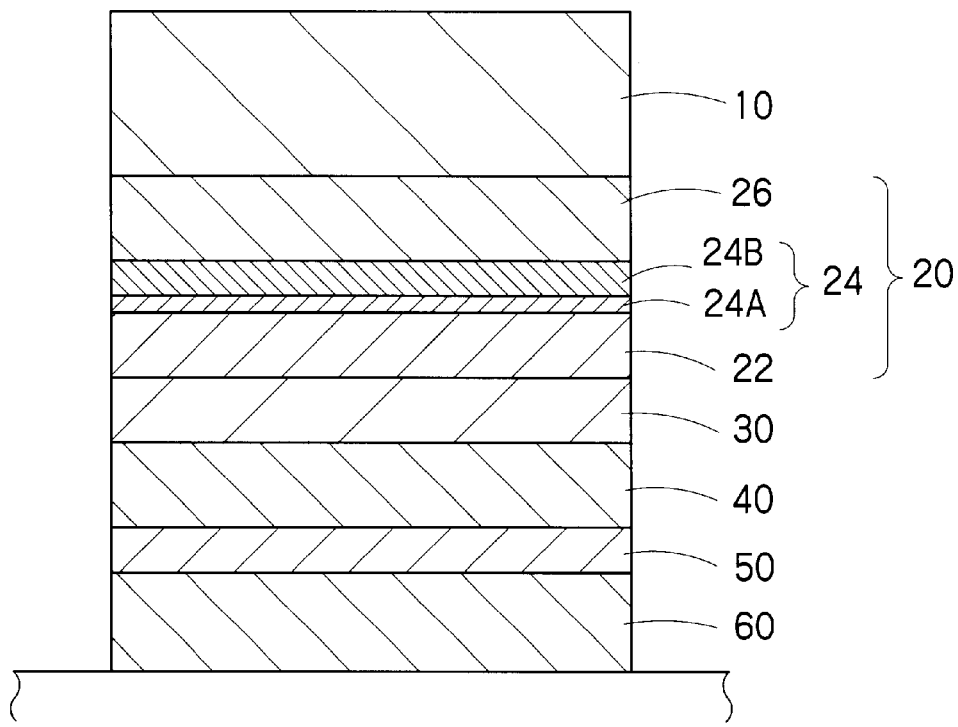
F I G. 7
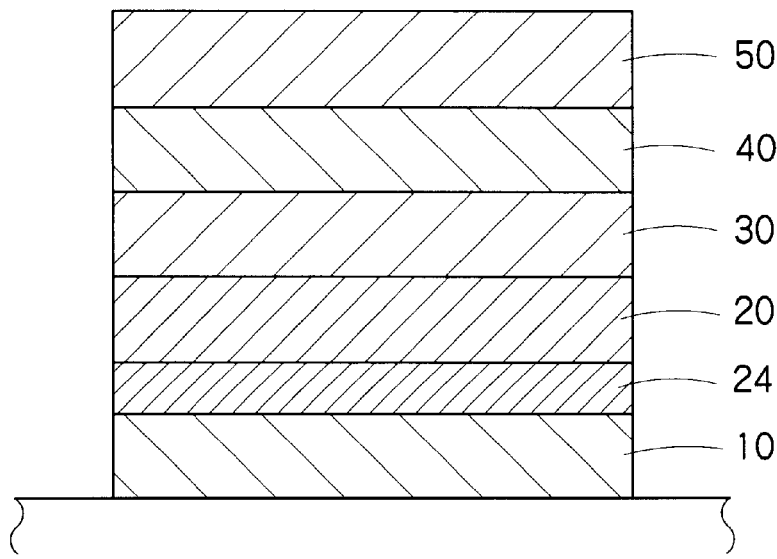
F I G. 8

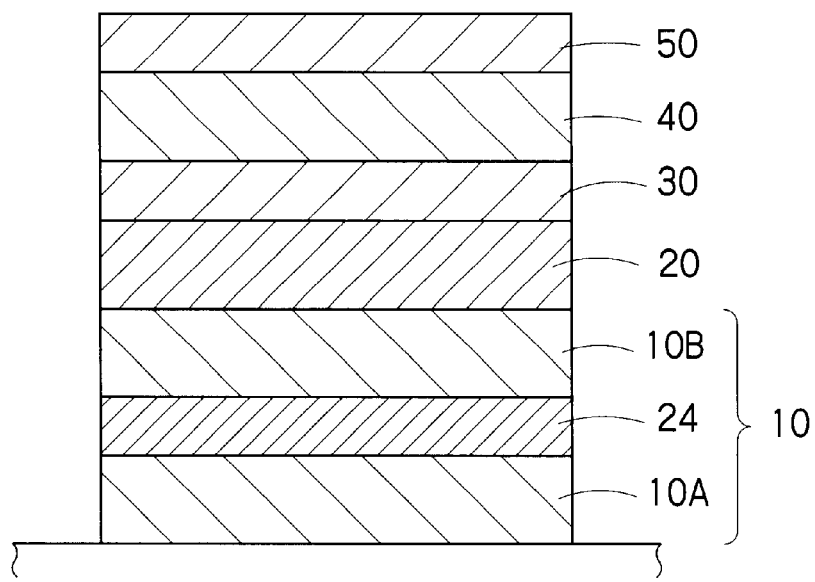
F I G. 9
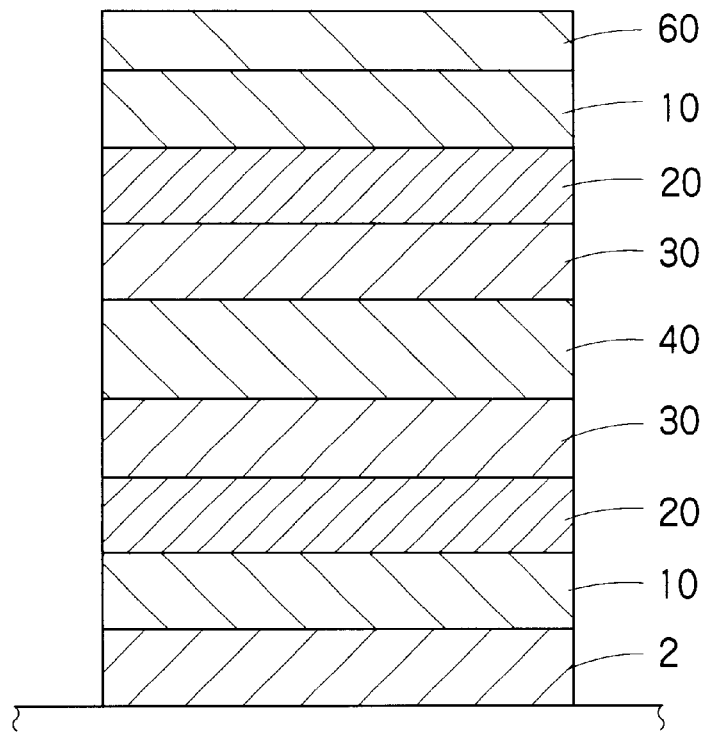
F I G. 10

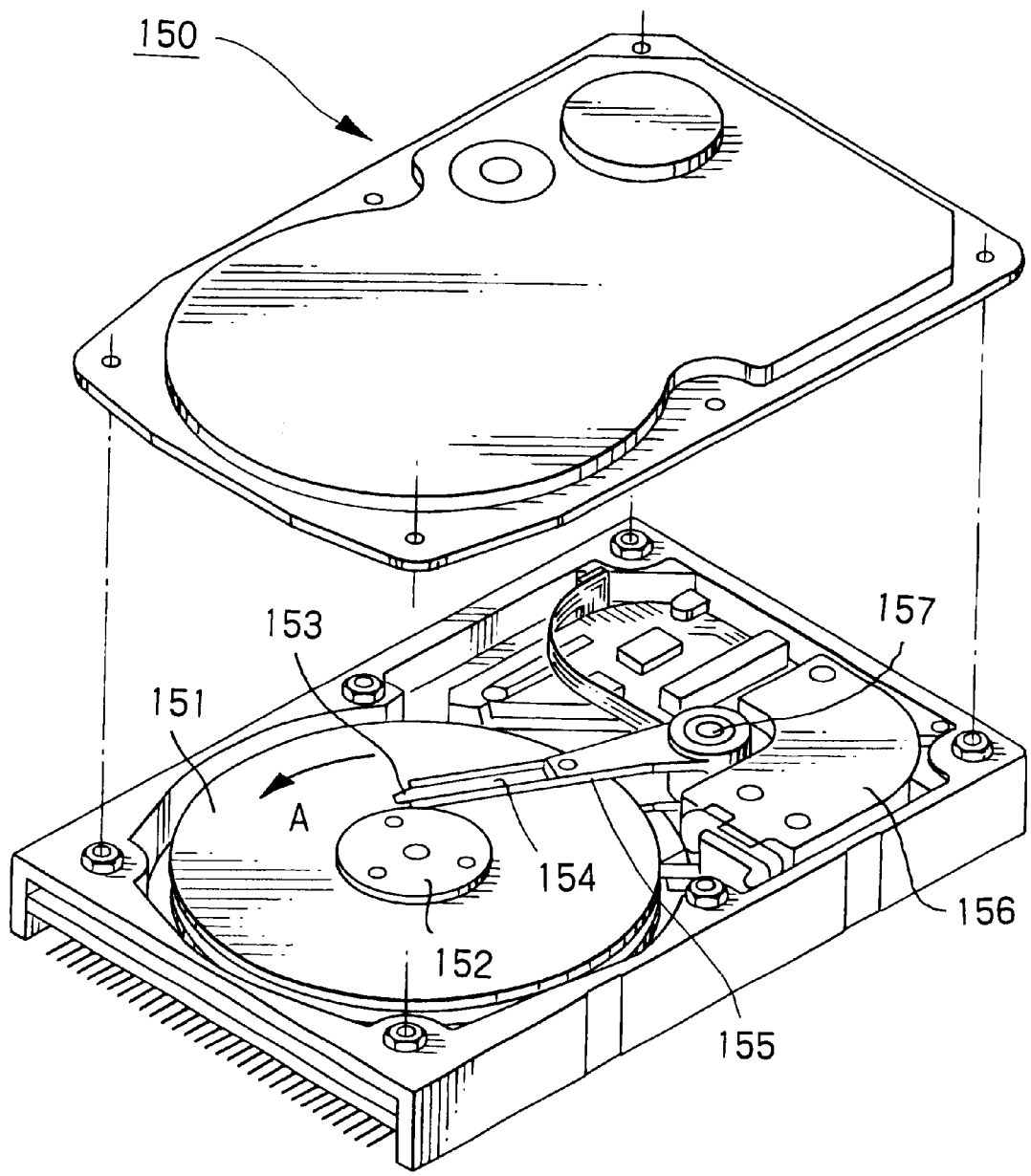
F I G. 12

MAGNETORESISTIVE ELEMENT AND MAGNETIC RECORDING APPARATUS

BACKGROUND OF THE INVENTION

This invention relates to a magnetoresistive element and a magnetic recording apparatus, and more particularly to a magnetoresistive element using a spin valve structure, and a magnetic recording apparatus using the magnetoresistive element as its magnetic head.

In general, reading of information recorded on a magnetic recording medium has been conducted by moving a reproducing magnetic head having a coil relative to the recording medium and detecting a voltage induced in the coil by electromagnetic induction generated upon movement of the magnetic head. It is also known to use a magnetoresistive element (hereinafter called "MR element") for reading out information (see, for example, IEEE MAG-7, 150(1971). Magnetic heads using a MR element (hereinafter called "MR head") relies on the phenomenon that electric resistances of some ferromagnetic materials vary with intensity of external magnetic field.

Along with recent progress toward miniaturization and large capacity of magnetic recording mediums, reproduced magnetic signals of information read out from recording mediums are getting weaker and weaker, and MR heads more sensitive and capable of extracting larger outputs are being anticipated. Especially in multi-layered films having a sandwich structure of ferromagnetic/non-magnetic/ferromagnetic layers, large magnetoresistance effects have been obtained. That is, while applying an exchanging bias to one of two ferromagnetic layers interposing a non-magnetic layer between them so as to pin its magnetization, magnetization of the other ferromagnetic layer is reversed by an external magnetic field (signal magnetic field, for example). Thus, the relative angle of magnetized directions of these two ferromagnetic layers sandwiching the non-magnetic layer is change, and a large magnetoresistance effect is obtained. The multi-layered film of this type is called "spin valve structure" (see Phys. Rev. B., Vol. 45, p806 (1992), J. Appl. Phys. Vol. 69, p4774(1991), for example).

Spin valve structures have large magnetoresistance changing rates ranging from 5% to 8% and their magnetization can be changed in low magnetic fields, spin valve structures are suitable for MR elements. However, to cope with higher recording density, larger MR changing rates are needed, and it is desired to increase current MR changing rates to two through three times or more. However, it is difficult to obtain MR changing rates larger than 10% with spin valve structures of a type simply stacking metal layers. Recently, attention has come to be paid to "specular spin valve structures" made by using an insulating ferroelectric material made of oxides such as NiO, $Fe_2O_3$, or the like, as the bias film and stacking an oxide film on the surface of the other magnetic material as well. As to specular spin valve structures, it is known that, by further sandwiching a sandwich film of magnetic/non-magnetic/magnetic layers between insulators, electrons can be specular-reflected at the metal/insulator interface and magnetoresistance effect as large as approximately 20% can be obtained. Specular spin valve structures need sandwiching the magnetic/non-magnetic/magnetic sandwich film with oxide layers from opposite sides thereof, and simultaneously need stacking at least one bias film in contact one of those magnetic layers for pinning magnetization. For this purpose, oxide antiferromagnetic layers of NiO, $Fe_2O_3$, or the like, are currently used. Heretofore, however, no satisfactory oxide antiferromagnetic material having an acceptable bias property has been known, and this is a bar against their practical use. That is, not having insulating antiferromagnetic material having a sufficiently large exchange bias magnetic field and a sufficiently high blocking temperature, it is still difficult to use specular spin valve structures as practical materials.

On the other hand, there is a recently proposed method which inserts a very thin oxide in a magnetic layer to obtain specular effect while using a metal antiferromagnetic material. With this method, a large MR effect can be obtained while using a metal antiferromagnetic material having a large exchange bias magnetic field and a sufficiently high blocking temperature. In this case, however, it is important to make the very thin oxide layer with a high accuracy and to make a good oxide layer while ensuring a high reproducibility.

SUMMARY OF THE INVENTION

It is therefore an object of the invention to provide a MR element and a magnetic recording apparatus using a MR element which has a pinned layer of a good bias property while using a secular spin valve structure with a large MR changing rate, and is improved in soft magnetic property.

To accomplish the object, a first MR element according to the invention, having a spin valve structure which includes a first magnetic film, a second magnetic film, and a non-magnetic spacer film interposed between the first magnetic film and the second magnetic film, is characterized in that: at least one of the first magnetic film and the second magnetic film includes a first ferromagnetic metal layer; a first non-metal layer provided on the first ferromagnetic metal layer; a second non-metal layer provided on the first non-metal layer and different in composition from the first non-metal layer; and a second ferromagnetic metal layer provided on the second non-metal layer. Thereby, a non-metal layer for specular-reflecting electrons can be made very thin with a good reproducibility.

A second magnetoresistive element according to the invention, having a spin valve structure which includes a first magnetic film, a second magnetic film, and a non-magnetic spacer film interposed between said first magnetic film and said second magnetic film, is characterized in that: at least one of said first magnetic film and said second magnetic film includes a first ferromagnetic metal layer; a second ferromagnetic metal layer provided on said first ferromagnetic metal layer and different in composition from said first ferromagnetic metal layer; a non-metal layer provided on said second ferromagnetic metal layer; and a third ferromagnetic metal layer provided on said non-metal layer. Thereby, a non-metal layer for specular-reflecting electrons can be made very thin with a good reproducibility.

A third magnetoresistive element according to the invention, having a spin valve structure which includes a first magnetic film, a second magnetic film, and a non-magnetic spacer film interposed between said first magnetic film and said second magnetic film, is characterized in that: at least one of said first magnetic film and said second magnetic film includes a first ferromagnetic metal layer; a first non-metal layer provided on said first ferromagnetic metal; a second ferromagnetic metal layer provided on said first non-metal layer; a second non-metal layer provided on said second ferromagnetic metal layer; and a third ferromagnetic metal layer provided on said second non-metal layer. Thereby, a specular-reflection of the electrons can be realized in much improved efficiency.

A fourth magnetoresistive element according to the invention, having a spin valve structure which includes a first magnetic film, a second magnetic film, and a non-magnetic spacer film interposed between said first magnetic film and said second magnetic film, is characterized in that: at least one of said first magnetic film and said second magnetic film includes: a first ferromagnetic metal layer containing at least one element selected from the group consisting of lithium (Li), beryllium (Be), sodium (Na), magnesium (Mg), aluminum (Al), silicon (Si), phosphorus (P), potassium (K), calcium (Ca), scandium (Sc), gallium (Ga), rubidium (Rb), strontium (Sr), yttrium (Y), cesium (Cs), barium (Ba) and elements belonging to the lanthanide series by not less than 1%; a non-metal layer formed on said first ferromagnetic metal layer; and a second ferromagnetic metal layer formed on said non-metal layer. Thereby, a non-metal layer for specular-reflecting electrons can be made very thin with a good reproducibility.

A fifth magnetoresistive element accroding to the invention, having a spin valve structure which includes a first magnetic film, a second magnetic film, and a non-magnetic spacer film interposed between said first magnetic film and said second magnetic film, is characterized in that: at least one of said first magnetic film and said second magnetic film includes a first ferromagnetic metal layer, a non-metal layer provided on said first ferromagnetic metal layer, and a second ferromagnetic metal layer provided on said non-metal layer, said non-metal layer being made of an antiferromagnetic material which satisfies the equation:

$$P \times (n+0.3) \leq T \leq P \times (n+0.7)$$

where T is the thickness of said non-metal layer, P is the magnetic period thereof, and n is an integer. Thereby, a high performance MR element can be proposed by realizing a synthetic antiferromagnetic coupling of the magnetic layers.

A sixth magnetoresistive element according to the invention, having a spin valve structure which includes a first magnetic film, a second magnetic film, and a non-magnetic spacer film interposed between said first magnetic film and said second magnetic film, is characterized in that: at least one of said first magnetic film and said second magnetic film includes a first ferromagnetic metal layer, a non-metal layer provided on said first ferromagnetic metal layer, and a second ferromagnetic metal layer provided on said non-metal layer, said non-metal layer being made of an antiferromagnetic material which satisfies the equation:

$$P \times (n-0.2) \leq T \leq P \times (n+0.2)$$

where T is the thickness of said non-metal layer, P is the magnetic period thereof, and n is an integer. Thereby, a high performance MR element can be proposed by realizing a fairly stable ferromagnetic coupling of the magnetic layers.

The thickness of the non-metal layer is defined as the distance between the centers of the metal atomic layers at the interfaces of the non-metal layer and the neighboring magnetic layers. These metal atomic layers are determined to be the ones adjacent to the oxygen atomic layers at the interfaces and to be outside of the oxygen atomic layers.

In other wards, the thickness of the non-metal layer is defined as the distance between the centers of the metal atomic layers which outwardly abut on the oxygen atomic layers at the interface between the non-metal layer and the neighboring magnetic layers. The definition is applicable to the case where the non-metal layer is made of an oxide compound which has a much more complicated crystal structure.

On the other hand, the magnetic recording apparatus according to the invention includes a magnetic head for recording and reproducing information on or from a magnetic recording medium, which uses any of the above-summarized MR elements, and ensures large reproduction signal outputs and good thermal stability.

The invention is used in the above-summarized modes and brings about the following effects.

First, according to the invention, by interposing a non-metal layer as an electron reflection layer in the pinned layer and stacking two kinds of layers under that non-metal layer, it is possible to fabricate a very thin, even non-metal layer with a good reproducibility by using the lower layer as a stopper layer against reaction. As a result, a good pinning property can be obtained by ensuring magnetic coupling between the first ferromagnetic metal layer and the second ferromagnetic metal layer while having electrons specular-reflected.

Additionally, by making the lower ferromagnetic metal layer of the non-metal layer in the pinned layer in form of a multi-layered structure and using the lower layer as a layer having a high bulk effect and high ferromagnetism, the pinning property is further improved to obtain a large MR changing amount.

Further, according to the invention, by using a multi-layered structure as the ferromagnetic metal layer under the non-metal layer in the pinned layer and using a ferromagnetic layer with a high bulk effect as its underlying layer, the pinning property can be improved more and a higher MR changing amount can be obtained.

Furthermore, according to the invention, by separately providing a plurality of non-metal layers for reflecting electrons in the pinned layer, it is possible to increase interfaces with ferromagnetic layers and thereby increase the probability of electrons being specular-reflected. More specifically, while ensuring magnetic coupling between ferromagnetic layers by using a non-metal layer so thin that pin holes can exist, specular-reflection efficiency of electrons can be increased largely. As a result, while maintaining the pinning property, momentum loss of electrons can be decreased significantly, and a large MR property can be realized.

Moreover, according to the invention, by using a synthetic antiferromagnetic layer as the pinned layer including a non-metal layer in the middle, shifting of the working point caused by the static magnetic field from the pinned layer can be prevented. Further, with no influences from the static magnetic field, the free layer can be made sufficiently thin, and the specular effect can be used more effectively.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1 is an outline diagram showing a cross-sectional structure of a magnetoresistive element according to the first embodiment of the invention;

FIGS. 2A through 2C are rough cross-sectional views showing a process for making a non-metal layer 24;

FIG. 3 is an outline diagram showing a cross-sectional structure of a magnetoresistive element according to the second embodiment of the invention;

FIG. 4 is an outline diagram showing a cross-sectional structure of a magnetoresistive element according to the third embodiment of the invention;

FIG. 5 is an outline diagram showing a cross-sectional structure of a magnetoresistive element according to the fourth embodiment of the invention;

FIG. 6 is an outline diagram showing a cross-sectional structure of a magnetoresistive element according to the fifth embodiment of the invention;

FIG. 7 is an outline diagram showing a cross-sectional structure of a magnetoresistive element according to the sixth embodiment of the invention;

FIG. 8 is an outline diagram showing an example interposing a non-metal layer for specular-reflection of electrons between a ferromagnetic layer and a first magnetic film;

FIG. 9 is an outline diagram showing an example interposing the non-metal layer for specular reflection of electrons in the middle of an antiferromagnetic layer;

FIG. 10 is an outline diagram showing a structure having upper and lower pinned layers;

FIG. 12 is a fragmentary perspective view showing an outline structure of a magnetic recording apparatus according to the invention.

DETAILED DESCRIPTION OF THE PREFERRED EMBODIMENTS

Figure 11:
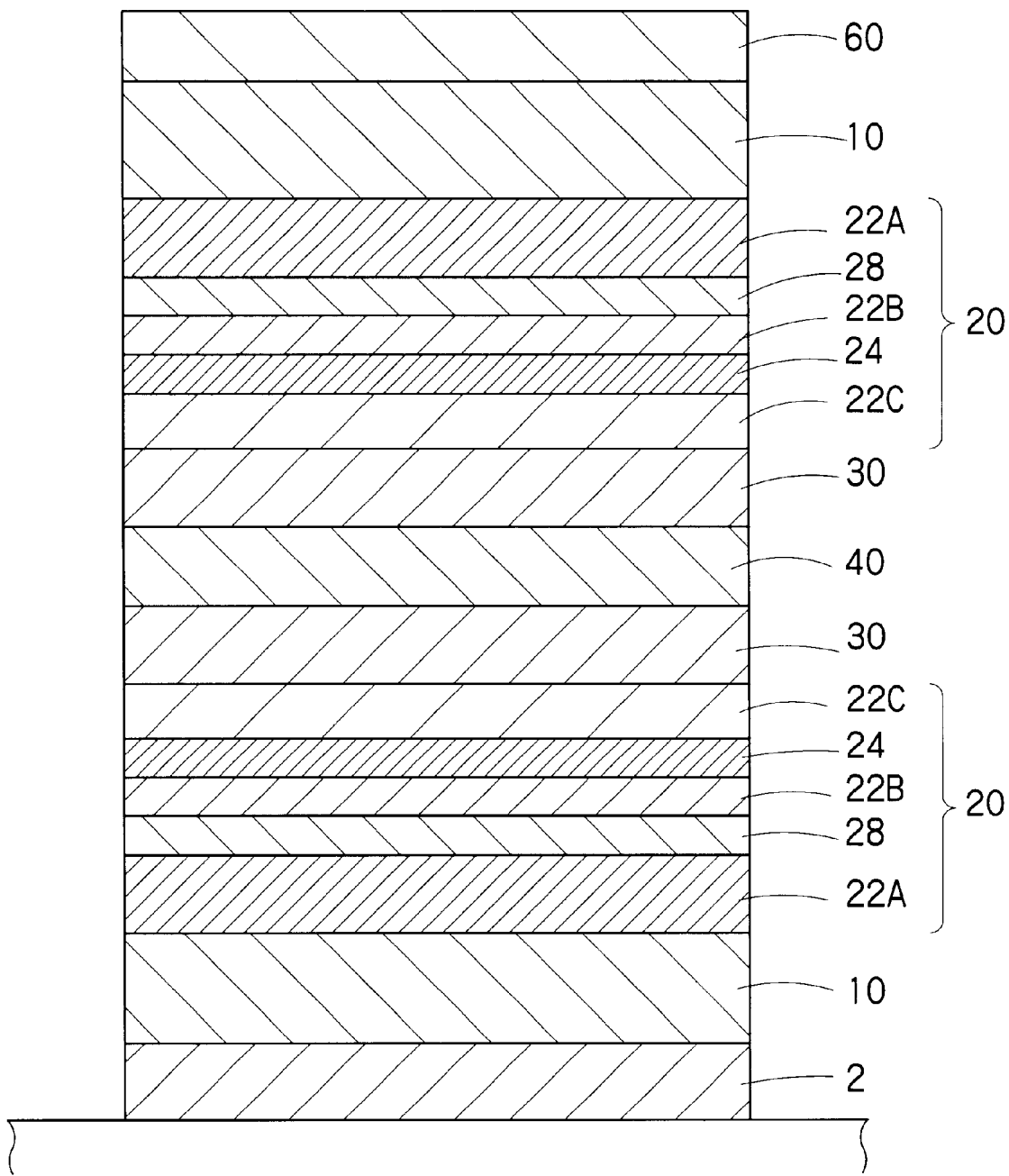
FIG. 11 is a cross-sectional outline diagram showing a modified example which employs a synthetic antiferromagnetic structure.

Explained below are some embodiments of the invention with reference to the drawings.

FIG. 1 is an outline diagram showing a cross-sectional structure of a MR element according to the first embodiment of the invention. The MR element according to the invention has a structure in which an antiferromagnetic layer 10, first magnetic film 20, non-magnetic spacer film 30, second magnetic film 40 and non-metal layer 50 are stacked in this order on a given substrate. The hardmagnetic layers 80 are provided on both sides of the layered structure and a pair of electrodes 82, 82 are placed on the hard magnetic layers 80, 80, respectively.

In this example, the first magnetic film 20 functions as a "pinned layer" pinned in magnetization and biased by unidirectional anisotropy. The second magnetic film 40 functions as a "magnetically susceptive layer" or "free layer" reversed in magnetization by an external magnetic field (such as signal magnetic field) generated from a magnetic recording medium, not shown.

The first magnetic film 20 as the "pinned layer" includes a ferromagnetic metal layer 22, non-metal layer 24 and ferromagnetic metal layer 26 stacked in this order. In this embodiment, the non-metal layer 24 has a multi-layered structure stacking a first non-metal layer 24A and a second non-metal layer 24B.

In the MR element according to the invention, by applying a bias voltage in the right-end-left direction on the sheet of FIG. 1 and measuring responsive changes in magnetic resistance, intensity of the magnetic field applied to the second magnetic film 40 can be detected. At that time, electric current generated by the bias voltage mainly flows in the horizontal direction in the second ferromagnetic metal layer 26, non-magnetic spacer film 30 and second magnetic film 40.

In order to obtain more prominent magnetoresistance effect, it is necessary to decrease the momentum loss of electrons flowing in the horizontal direction upon application of the bias voltage.

According to the invention, by providing a non-metal layer 50 on the second magnetic film 40 as one of improvements thereof, specular reflection of electrons can be brought about between these layers. As a result, the momentum loss of electrons can be reduced.

By inserting a non-metal layer 24 in the first magnetic film 20 as another improvement of the invention, specular reflection of electrons can be brought about also at the interface between the second ferromagnetic metal layer 26 and the non-metal layer 24. More specifically, when a metallic ferromagnetic material such as NiMn, PtMn, IrMn, or the like is used as the material of the antiferromagnetic layer 10, it is difficult to bring about specular reflection of electrons between the antiferromagnetic layer 10 and the first magnetic film 20, and a momentum loss of electrons inevitably occurs. According to the invention, however, reflection of electrons can be ensured at both interfaces with the upper and lower magnetic layers of the current path while using a metallic antiferromagnetic material.

As a result, momentum loss of electrons can be minimized, and a good bias magnetic field property can be realized while using an antiferromagnetic material. Further, while maintaining a blocking temperature as high as not lower than 250° C., a large value increased by 15% or more can be obtained as the MR changing rate.

If the non-metal layer 24 inserted in the first magnetic film 20 is ttoo thick, there occurs the problem that it disturbs magnetic coupling between the overlying and underlying ferromagnetic metal layers 22 and 26 and disables to obtain a good pinning property. On the other hand, if the non-metal layer 24 is too thin, it is difficult to make an even, continuous thin film, and sufficient specular-reflection of electrons is not ensured. That is, there occurs the need for making a very thin and uniform thin film with a good reproducibility as the non-metal layer 24.

In general, in case of making a very thin non-metal layer, it is preferable to first make a base metal layer for making the non-metal layer and thereafter expose its surface to an atmosphere of a gas containing oxygen (O), nitrogen (N) or fluorine (F), or its plasma, to invite interaction between them. However, if the interaction progresses too much, the non-metal layer will become too thick, and will make it difficult to obtain a good pinning property due to interruption of magnetic coupling at the non-metal layer. Therefore, progress of the interaction must be controlled reproducibly, but precise control of interaction was not easy with the conventional structure.

In contrast, according to the invention, by making the non-metal layer 24 in form of the multi-layer structure of the first non-metal layer 24A and the second non-metal layer 24B, the entirety of the non-metal layer 24 can be made thin with a reproducibility. That is, this embodiment uses a multi-layered structure including two or more kinds of materials for making the non-metal layer 24. Used as the material of the first non-metal layer 24A is a material which is strong against interaction such as oxidation or nitriding. Used as the material of the second non-metal layer 24B is a material capable of bringing about good electron reflection after interaction.

FIGS. 2A through 2C are rough cross-sectional views showing a process for making a non-metal layer 24.

First as shown in FIG. 2A, a multi-layered structure of a base layer 22 and a thin film X is prepared. Preferably, the base layer 22 preferably serves also as a part of the first ferromagnetic metal layer and is made of a material which is strong against oxidation, nitriding or fluorination. The material preferably contains nickel (Ni), and a nickel-iron (NiFe) alloy, for example, may be used.

The thin film X is made of a material capable of causing good electron reflection by oxidation, nitriding or fluorination. Examples of such material are, for example, and cobalt iron (CoFe) further containing group consisting of lithium (Li), beryllium (Be), sodium (Na), magnesium (Mg), aluminum (Al), silicon (Si), phosphorus (P), potassium (K), calcium (Ca), scandium (Sc), gallium (Ga), rubidium (Rb), strontium (Sr), yttrium (Y), cesium (Cs), barium (Ba) and elements belonging to the lanthanide series.

The thin film X can be deposited by sputtering, vacuum evaporation or CVD, for example. In this case, it is relatively easy to deposit the thin film X sufficiently thin.

Next as shown in FIG. 2B, the first non-metal layer 24A and the second non-metal layer 24B are formed. More specifically, by exposure to an atmosphere containing oxygen (O), nitrogen (N) or fluorine (F), the thin film X is brought into interaction with the surface of the base layer 22. In this case, since reactivity of the thin film X is relatively high, the entirety there of interacts, and forms the second non-metal layer 24B. However, since the base layer 22 contains a material highly resistant to reaction, progress of the interaction is blocked, and a very thin non-metal layer 24A is made. That is, the entire thickness of the non-metal layer 24 is substantially determined by the thickness of the thin film X. Therefore, a very thin, uniform non-metal layer 24 can be made with a good reproducibility.

According to the invention, the base layer functions as a stopper layer and ensures reproducible formation of the very thin, uniform non-metal layer. As a result, while inviting specular-reflection of electrons, magnetic coupling between the first ferromagnetic metal layer 22 and the second ferromagnetic metal layer 26 can be ensured, and a good pinning property can be obtained.

Although FIG. 1 through FIG. 2c show an example in which the non-metal layer 24 is made of two kinds of non-metal layers, the invention is not limited to it. That is, a multi-layered structure including three or more kinds of non-metal layers may be employed as the non-metal layer 24. In this case, as well, the same effects are obtained by providing a layer for ensuring specular-reflection of electrons on the top side and providing a layer having the role of preventing excessive reaction on the bottom side.

Next explained in greater detail are structures of individual layers forming the MR element according to this embodiment.

First, usable as the material of the non-metal layer 24 are oxides, nitrides or fluorides. If a non-magnetic material (exhibiting neither ferromagnetic magnetization arrangement or antiferromagnetic arrangement of spins at room temperatures) is used among them, the total thickness of the non-metal layer 24 is preferably not larger than 3 nm. Its reason lies in that, if the non-metal layer 24 is thicker, magnetic coupling force decreases between the ferromagnetic metal layers 22, 26 at opposite sides of the non-metal layer 24, and makes it difficult to pin the magnetization of the ferromagnetic metal layer 26 in contact with the non-magnetic spacer film 30. For obtaining better pinning, the total thickness of the non-metal layer 24 is preferably not larger than 2 nm.

When an antiferromagnetic material or a ferromagnetic material is used as material of the non-metal layer 24, the upper and lower magnetic layers 22, 26 can be magnetically pinned via the non-metal layer 24. Therefore, if the total thickness of the non-metal layer 24 is not larger than 5 nm, magnetization of the ferromagnetic metal layer 26 in contact with the non-magnetic spacer film 30 can be pinned sufficiently. However, for stronger magnetic coupling, the total thickness of the non-metal layer 24 is preferably not larger than 3 nm.

Especially when a ferromagnetic material is used, larger MR changing rate and inter-layer coupling can be obtained.

When the material of the non-metal layer 24 is an antiferromagnetic material, the Neel temperature is preferably not lower than 250° C., and more preferably not lower than 300° C., taking the environmental temperature into account. If the Neel temperature is low, thermal stability of the coupling between the upper and lower ferromagnetic layers 22, 26 will deteriorate.

In the present invention, however, since the non-metal layer 24 for specular reflection of electrons is sandwiched by ferromagnetic layers 22, 26 from opposite sides, the Neel temperature increases than the bulk value due to the molecular magnetic field from the ferromagnetic material. Therefore, opposite sides of the non-metal layer 24 as the electron reflection layer are preferably sandwiched with a Fe (F) or Co (Co) alloy with a high Curie point. In this manner, asufficiently high Neel temperature is ensured even with the material such as NiO (nickel oxide) by adequately adjusting the composition.

On the other hand, in the case where the material of the non-metal layer 24 is a ferroelectric material, the Curie temperature is preferably not lower than 100° C., and more preferably not lower than 200° C., taking the environmental temperature into account. Here again, since the non-metal layer 24 as the electron reflection layer is sandwiched with the ferromagnetic layers 22, 26 from opposite sides, the Curie point increases than the bulk value due to the molecular magnetic field from the ferromagnetic material. Therefore, opposite sides of the non-metal layer 24 as the electron reflection layer are preferably sandwiched with a Fe or Co alloy with a high Curie point. In this manner, a sufficiently high Curie point is ensured even with a material such as perovskite-based one by adequately adjusting the composition. Even with a material such as ferrite-based one, a more sufficient Curie point can be ensured.

Regarding the mode of magnetic coupling between the upper and lower ferromagnetic metal layers 22, 26, they may be coupled to orient their magnetization in parallel or in anti-parallel. Also, they may be coupled to make an angle of approximately 90 degrees between their magnetization. Other angles are also acceptable. As to intensity of the coupling, it is desirable to limit changes in angle within 10 degrees in the external magnetic field of 400 Oe.

In order to ensure parallel coupling of the upper and lower magnetic layers, it is desirable to use a ferromagnetic material or a ferrimagnetic material as the material of the non-metal layer 24. However, an antiferromagnetic material is also usable. In this case, it is desirable to use an insulator like NiO in which magnetization of each atomic layer is oriented in anti-parallel with respect to the stack of atoms. In this case, thickness of the non-metal layer 24 is preferably determined so that the number of magnetic atomic layers be closer to an even number.

More specifically, it is desirable to use as the material of the non-metal layer 24 a ferromagnetic material and to determine its thickness to satisfy the equation $P \times (n-0.2) \leq T \leq P \times (n+0.2)$ where T is its thickness, P is its magnetic period, and n is an integer. The "magnetic period" herein means the period of magnetization spins occurring in the thickness direction of the non-metal layer. It also involves the case, for example, where one magnetic period spirally changes over several atomic layers.

It is possible to use an insulator, such as NiO (nickel oxide), in which magnetization of each atomic layer is oriented in anti-parallel with respect to the stack of atoms. (111)-oriented NiO film has a stacked structure of; nickel atomic layer/oxygen atomic layer/nickel atomic layer/ oxygen atomic layer/nickle atomic layer. In the case, one magnetic period corresponds to the following stack; oxygen atomic layer/nickel atomic layer/oxygen atomic layer/nickel atomic layer. Therefore, in order to ensure parallel coupling of the upper and lower magnetic layers, it is desirable to adjust the thickness of the non-metal layer 24 so that the number of oxygen atomic layers in the thickness direction of the non-metal layer be closer to an even number. It should be noted that the number of the oxygen atomic layers need not to precisely be an even number since it is sufficient to make the magnetic coupling as a whole in parallel.

In such a case, the thickness of the non-metal layer is defined as the distance between the centers of the metal atomic layers at the interfaces of the non-metal layer and the neighboring magnetic layers. These metal atomic layers are determined to be the ones adjacent to the oxygen atomic layers at the interfaces and to be outside of the oxygen atomic layers.

In the above-mentioned case, for example, these "metal atomic layers" may be nickel atomic layers or atomic layers of the neighboring magnetic layers. If the non-metal layer terminates with oxygen atomic layer at the interface, the "metal atomic layer" is determined to be the one of the neighboring magnetic layers. If the non-metal layer terminates with nickel atomic layer at the interface, the "metal atomic layer" is determined to be the nickel atomic layer.

In other wards, the thickness of the non-metal layer 24 is defined as the distance between the centers of the metal atomic layers which outwardly abut on the oxygen atomic layers at the interface between the non-metal layer and the neighboring magnetic layers.

Above-described definition is applicable to the case where the non-metal layer 24 is made of an oxide compound which has a much more complicated crystal structure.

On the other hand, in order to ensure anti-parallel coupling of the upper and lower ferromagnetic metal layers 22, 26, it is desirable to use as the material of the non-metal layer 24 an antiferromagnetic material and to determine its thickness to satisfy the equation $P \times (n+0.3) \leq T \leq P \times (n+0.7)$ where T is its thickness, P is its magnetic period, and n is an integer. The "magnetic period" may involve the case, for example, where one magnetic period spirally changes over several atomic layers as mentioned above.

More specifically, it is possible to use an insulator, such as NiO (nickel oxide), in which magnetization of each atomic layer is oriented in anti-parallel with respect to the stack of atoms. In this case, one magnetic period corresponds to the following stack: oxygen atomic layer/nickel atomic layer/ oxygen atomic layer/nickel atomic layer. It is desirable, therefore, to determine the thickness of the non-metal layer 24 so that the number of oxygen atomic layers in the thickness direction of the non-metal layer be closer to an odd number. It should be noted that the number of the oxygen atomic layers need not to precisely be an odd number since it is sufficient to make the magnetic coupling as a whole in anti-parallel.

Also when a ferrimagnetic material is used, it is desirable to choose a surface in which spin sites of the electron reflection layer at the interface between the ferromagnetic material and the non-metal layer 24 as the electron reflection layer includes more one-directional spin sites and to determine the thickness of the film to orient the directions of the spin in anti-parallel between the upper interface and the lower interface.

Although the non-metal layer may be amorphous, it is preferably microcrystalline or polycrystalline, and it more preferably has an epitaxial relation with the magnetic layer. Especially for reinforcing the coupling between the upper and lower magnetic layers 22, 26 and increasing the electron reflection coefficient, it preferably has such an epitaxial relation.

Although the non-magnetic layer 24 may be in form of a completely continuous thin film, pin holes may exist. When the non-magnetic layer 24 has pin holes, the upper and lower magnetic layers 22, 26 can magnetically couple through them, and strong magnetic coupling is expected. However, if there are too many pin holes, electron reflection effect decreases. Therefore, the ratio of pin holes is preferably limited within 50% in area of the entirety. To increase the electron reflection effect, the ratio of pin holes is preferably not larger than 20%, and more preferably not larger than 10%.

Average unevenness of the interface for specular-reflecting electrons, namely, the interface between the second non-metal layer 24B and the ferromagnetic metal layer 26, may be 2 nm or more, but it is more preferably not larger than 2 nm. When the unevenness of the interface is 2 nm or more, MR changing rate undesirably decreases due to deterioration of the electron reflection coefficient. As shown in FIG. 1, when the antiferromagnetic layer 10 is at the bottom, a larger electron reflection effect can be obtained because smoothness of the spin valve structure increases, and unevenness of the surface or the interface decreases. In this case, to further decreases the unevenness of the interface, tantalum (Ta), titanium (Ti), chrome (Cr) or aluminum (Al), for example, can be used as the base layer of the antiferromagnetic layer 10.

It is also effective to provide a base layer for improving the affinity with the substrate, then stack a material such as copper (C), gold (Au) or silver (Ag) for improving the crystal line orientation and stack the antiferromagnetic layer 10 thereon. In this case, difference in lattice constant between the base layer and the metal layer stacked thereon is preferably limited within 5%. In this manner, smoothness and orientation of the it entirety can be improved, electron reflection coefficient increases, and larger MR effect can be obtained.

It is not essential that the non-metal layer 24 as the electron reflection layer has an oriented structure. More preferably, however, it has a oriented structure so that the closest packed atomic plane becomes parallel to the electron reflecting plane. By giving such an oriented structure, larger electron reflection ratio can be obtained. Additionally, the film quality of the ferromagnetic metal layer 26 stacked thereon is improved, and soft magnetic property can be also improved in the structure having the antiferromagnetic layer 10 at the bottom as shown in FIG. 1.

Usable as the material of the ferromagnetic metal layer 22, 26 or the second magnetic film 40 are magnetic materials such as nickel (Ni), cobalt (Co) or iron (Fe). However, binary magnetic alloys such as NiFe and CoFe are also usable. To obtain a large MR changing rate and a good soft magnetic property, the use of magnetic alloys containing cobalt (Co) is desirable. By using a cobalt alloy, larger spin-dependent scattering and good electron reflection effect can be obtained, and large MR effect is obtained. Similarly, ternary magnetic alloys or alloys of four or more basic elements are also usable.

The ferromagnetic metal layers 22, 26 need not be made of a common material, and may be made of different materials such as NiFe for one and CoFe for the other, for example. In this case, when the resistance of the ferromagnetic metal layer 22 not contacting the non-magnetic spacer film 30 is higher, the shunt effect can be decreased. Therefore, an additive for increasing the resistance, such as chrome (Cr), tantalum (Ta), titanium (Ti), vanadium (V), tungsten (W), rhodium (Rh) or ruthenium (Ru), is preferably added to the ferromagnetic metal layer 22.

Especially in the structure shown in FIG. 1, the first ferromagnetic metal layer 22 may have a two-layered structure to have the lower layer function substantially as a pinning layer and the upper layer function to stop reaction. In this case, material of the lower layer preferably has a large bulk effect affecting the MR changing rate. For example, a cobalt (Co) alloy can be used, and its thickness is preferably thicker. Material of the upper layer may be a nickel-based magnetic alloy, and its thickness is preferably thinnest within the range capable of stopping reaction.

Each of these magnetic layers 22, 26, 40 may have a multi-layered structure including at least two layers of a magnetic material and a non-magnetic material. For example, the two-layered structure like CoFe/Cu can be used. Alternatively, the three-layered structure like CoFe/Ru/CoFe can be used, and any multi-layered structure including four or more layers can be used as well.

It is not essential that these magnetic layers have an orientation. More preferably, however, they have a closest packed surface orientation. In a magnetic material having a fcc crystal lattice structure, it preferably has (111) surface orientation. In a magnetic material having a bcc structure, it preferably has (100) surface orientation. In a magnetic material having a hcp structure, its c-plane is desirably oriented horizontally.

Next explained is the second embodiment of the invention.

FIG. 3 is an outline diagram showing a cross-sectional structure of a MR element according to the second embodiment of the invention. Here again, the MR element has the structure in which the antiferromagnetic layer 10, first magnetic film 20, non-magnetic spacer film 30, second magnetic film 40 and non-metal layer 50 are stacked in this order on a substrate. Structures and roles of individual layers may be substantially the same as those explained with reference to FIGS. 1 through 2C. So, by labeling them with common reference numerals, detailed explanation thereof is omitted.

In this embodiment, the first ferromagnetic metal layer 22 has a multi-layered structure of two or more kinds of ferromagnetic materials. In the example shown in FIG. 3, the first ferromagnetic metal layer 22 is made by stacking a first layer 22A and a second layer 22B.

The first layer 22A functions substantially as a pinning layer, and it is preferably made of a material which realizes a large unidirectional anisotropy. Examples thereof are alloys made by adding one kind of, or two or more kinds of, iron (Fe), nickel (Ni), gold (Au), silver (Ag), copper (Cu), palladium (Pd), platinum (Pt), iridium (Ir), rhodium (Rh), ruthenium (Ru), osmium (Os), hafnium (Hf), etc. to cobalt.

The second layer 22B is made of a material having a ferromagnetic property capable of operating as a pinning layer and a high resistance to oxidation, nitriding or fluorination during formation of the non-metal layer 24. That is, as already explained with reference to the first embodiment, the non-metal layer 24 is made as a result of reaction of the surface layer of the second layer 22B. In this case, by preventing excessive reaction, the non-metal layer 24 which is very thin as a whole and uniform can be obtained with a good reproducibility. Usable as material of the second layer 22B is, for example, a nickel (Ni) alloy.

According to this embodiment, various effects explained with reference to the first embodiment can be obtained similarly. Additionally, since the first layer 22A having a high bulk effect is provided in the first ferromagnetic metal layer 22, the pinning is further improved, and larger unidirectional anisotropy is obtained.

Next explained is the third embodiment of the invention.

FIG. 4 is an outline diagram showing a cross-sectional structure of a MR element according to the third embodiment of the invention. Here again, the MR element has the structure in which the antiferromagnetic layer 10, first magnetic film 20, non-magnetic spacer film 30, second magnetic film 40 and non-metal layer 50 are stacked in this order on a substrate. Structures and roles of individual layers may be substantially the same as those explained with reference to FIGS. 1 through 2C. So, by labeling them with common reference numerals, detailed explanation thereof is omitted.

In this embodiment, the first magnetic film 20 has a multi-layered structure alternately stacking at least two non-metal layers and at least three ferromagnetic metal layers.

In the example shown in FIG. 4, the first magnetic film 20 is made up of a first layer 22A of a ferromagnetic metal, first non-metal layer 24A, second layer 22B of a ferromagnetic metal, second non-metal layer 24B and third layer 26 of a ferromagnetic metal which are stacked in this order.

To ensure a pinning property, magnetic coupling must be maintained between layers of ferromagnetic metals, namely, among those first to three layers 22A, 22B and 26. For this purpose, non-metal layers 24A and 24B interposed between those layers should be thin in thickness. However, if they are excessively thin, pin holes are liable to be produced, and efficiency of specular reflection of electrons decreases.

In contrast, according to this embodiment, since separate non-metal layers 24A and 24B are provided, they increase the interface with ferromagnetic layers, and increase the probability of specular reflection of electrons. That is, according to this embodiment, by individually interposing a plurality of non-metal layers among layers of ferromagnetic materials, efficiency of specular reflection of electrons can be multiplied while maintaining magnetic coupling among ferromagnetic layers via non-metal layers as thin as producing pin holes. As a result, large MR property can be realized by significantly reducing the momentum loss of electrons while maintaining the pinning property.

Next explained is the fourth embodiment of the invention.

FIG. 5 is an outline diagram showing a cross-sectional structure of a MR element according to the fourth embodiment of the invention. Here again, the MR element has the structure in which the antiferromagnetic layer 10, first magnetic film 20, non-magnetic spacer film 30, second magnetic film 40 and non-metal layer 50 are stacked in this order on a substrate. Structures and roles of individual layers may be substantially the same as those explained with reference to FIGS. 1 through 2C. So, by labeling them with common reference numerals, detailed explanation thereof is omitted.

In this embodiment, the first magnetic film 20 includes at least one non-metal layer as a middle layer, and a ferromagnetic metal layer in contact with the non-metal layer contains at least one of lithium (Li), beryllium (Be), sodium (Na), magnesium (Mg), aluminum (Al), silicon (Si), phosphorus (P), potassium (K), calcium (Ca), scandium (Sc), gallium (Ga), rubidium (Rb), strontium (Sr), yttrium (Y), cesium (Cs), barium (Ba) and elements belonging to the lanthanide series by not less than 1%. Among these additive species, one of aluminum (Al), silicon (Si) and elements belonging to the lanthanide series is more preferable to use.

In the example shown in FIG. 5, the first magnetic film 20 is made by stacking a first ferromagnetic metal layer 22' and non-metal layer 24 and second ferromagnetic metal layer 26 in this order. Then, the first ferromagnetic metal layer 22' contains 1% of selected one of above-indicated elements.

The non-metal layer 24 is made by oxidizing, nitriding or fluoridizing the surface of the first ferromagnetic metal layer 22', In this process, chrome, aluminum or silicon preferentially interacts, and contributes to formation of a dense, smooth non-metal layer 24. As a result, good MR changing rate can be obtained with a good reproducibility.

Similar effect can be obtained also in structures other than that shown in FIG. 5. For example, in the structure shown in FIG. 4, if at least one of the ferromagnetic metal layers 22A and 22B is made to contain at least one of lithium (Li), beryllium (Be), sodium (Na), magnesium (Mg), aluminum (Al), silicon (Si), phosphorus (P), potassium (K), calcium (Ca), scandium (Sc), gallium (Ga), rubidium (Rb), strontium (Sr), yttrium (Y), cesium (Cs), barium (Ba) and elements belonging to the lanthanide series by 1% or more, similar effect can be obtained.

Next explained is the fifth embodiment of the invention.

FIG. 6 is an outline diagram showing a cross-sectional structure of a MR element according to the fifth embodiment of the invention. Here again, the MR element has a spin valve structure in which the antiferromagnetic layer 10, first magnetic film 20, non-magnetic spacer film 30, second magnetic film 40 and non-metal layer 50 are stacked in this order on a substrate. Structures and roles of individual layers may be substantially the same as those explained with reference to FIGS. 1 through 2C. So, by labeling them with common reference numerals, detailed explanation thereof is omitted.

Also in this embodiment, the first magnetic film 20 has a multi-layered structure stacking a ferromagnetic metal layer 22, non-metal layer 24' and ferromagnetic metal layer 26. The non-metal layer 24' is antiferromagnetic, and its thickness T is in the range of the equation $P\times(n+0.3) \leq T \leq P\times(n+0.7)$ where T is its thickness, P is its magnetic period, and n is an integer.

With this structure, the upper and lower ferromagnetic metal layers 22 and 26 sandwiching the non-metal layer 24' can be brought into anti-parallel magnetic coupling. That is, by controlling the number of atomic surfaces of the non-metal layer 24' as mentioned above, the first magnetic film 20 can be made in form of a "synthetic antiferromagnetic structure". Then, in this manner, since the upper and lower magnetic layers 22, 26 cancel their magnetization with each other, static magnetic field applied from the pinned layer, i.e. first magnetic film 20, to the free layer, i.e. second magnetic film 40 can be reduced sufficiently. Shifting of the working point caused by the static magnetic field from the pinned layer has been a serious problem when actually manufacturing a magnetic head. This embodiment, however, can overcome the problem by making the first magnetic film 20 of a synthetic antiferromagnetic material.

In a so-called specular spin valve, larger MR changing rate can be obtained by decreasing the thickness of the free layer. However, when the free layer is simply thinned, there occurs the problem that the working point is shifted due to influences from the static magnetic field as explained above. This embodiment, however, can make a sufficiently thin free layer by using a synthetic antiferromagnetic material as the first magnetic film 20, and can use the specular effect more efficiently.

As an example of the non-metal layer 24', oxides containing nickel (Ni), for example, can be mentioned. For making a thin film with a close packed orientation of nickel oxide, for example, atomic layers containing nickel and atomic layers containing oxygen as its major element are alternately stacked.

Next explained is an alternative example of the fifth embodiment of the invention.

Here again, the MR element according to the example has a spin valve structure in which the antiferromagnetic layer 10, first magnetic film 20, non-magnetic spacer film 30, second magnetic film 40 and non-metal layer 50 are stacked in this order on a substrate as shown in FIG. 6. Structures and roles of individual layers may be substantially the same as those explained with reference to FIGS. 1 through 2C. So, by labeling them with common reference numerals, detailed explanation thereof is omitted.

Also in this alternative example, the first magnetic film 20 has a multi-layered structure stacking a ferromagnetic metal layer 22, non-metal layer 24' and ferromagnetic metal layer 26. The non-metal layer 24' is antiferromagnetic, and its thickness T is in the range of the equation $P\times(n-0.2) \leq T \leq P\times(n+0.2)$ where T is its thickness, P is its magnetic period, and n is an integer.

With this structure, the upper and lower ferromagnetic metal layers 22 and 26 sandwiching the non-metal layer 24' can be brought into parallel magnetic coupling. That is, by controlling the number of atomic surfaces of the non-metal layer 24' as mentioned above, the ferromagnetic layers 22 and 26 can be magnetically coupled more strongly due to the magnetic coupling of the antiferromagnetic layers. Accordingly, the magnetic stability is improved and stable MR element is realized.

As a material of the non-metal layer 24', oxides containing nickel (Ni), for example, can be used. For making a thin film with a close packed orientation of nickel oxide, for example, atomic layers containing nickel and atomic layers containing oxygen as its major element are alternately stacked. In this alternative example, by determining the number of these atomic layers to be an even number in the thickness direction of the non-metal layer 24', magnetization of the upper and lower ferromagnetic materials can be oriented in parallel. In the case of nickel oxide, the magnetization couples in anti-parallel fashion across the oxygen atomic layer. Therefore, the number of the oxygen atomic layers should be substantially an even number.

Next explained is the sixth embodiment of the invention.

FIG. 7 is an outline diagram showing a cross-sectional structure of a MR element according to the sixth embodiment of the invention. Here again, the MR element includes the antiferromagnetic layer 10, first magnetic film 20, non-magnetic spacer film 30, second magnetic film 40 and non-metal layer 50. Structures and roles of individual layers may be substantially the same as those explained with reference to FIGS. 1 through 2C. So, by labeling them with common reference numerals, detailed explanation thereof is omitted.

In this embodiment, the stacking order of those layers is opposite. That is, in the first embodiment explained before, the MR element includes the antiferromagnetic layer 10, first magnetic film 20, non-magnetic spacer film 30, second magnetic film 40 and non-metal layer 50 are stacked in this order on a substrate. In the embodiment of FIG. 7, however, the stacking order is reversed. That is, the non-metal layer 50, second magnetic film 40, non-magnetic spacer film 30, first magnetic film 20 and antiferromagnetic layer 10 are stacked in this order on a substrate.

However, also in this embodiment, the stacking order of the layers 22, 24A, 24B and 26 forming the first magnetic film 20 is the same as that of the first embodiment. That is, the non-metal layer 24A has the role as a stopper layer for stopping oxidation, nitriding or fluorination to ensure the non-metal layer 24 be made thin and uniform. In this embodiment, however, specular reflection of electrons takes place at the interface between the layer 24A and the ferromagnetic metal layer 22.

Also with this embodiment, the non-metal layer 24 can be made thin and uniform, and various effects as those of the first embodiment can be obtained similarly.

Also in the structures shown and explained as the second to fifth embodiments, the stacking order of the layers can be reversed similarly. That is, in each of the multi-layered structures shown in FIGS. 3 to 6, the non-metal layer 50, second magnetic film 40, non-magnetic spacer film 30, first magnetic film 20 and antiferromagnetic layer 10 may be stacked in this order. Here again, however, the multi-layered structure of respective layers forming the first magnetic film 20 must be the same as illustrated in FIGS. 3 to 6.

Even by reversing the stacking order, the same effects can be obtained.

Was Heretofore, structures including the non-metal layer in the middle of the first magnetic film have been explained as the first to sixth embodiments.

The non-metal layer for specular-reflecting electrons may be interposed between the ferromagnetic layer and the first magnetic film as shown in FIG. 8. In the example shown in FIG. 8, the non-magnetic spacer film 30, second magnetic film 40 and non-metal layer 50 are stacked in this order. Here again, structures and roles of individual layers may be substantially the same as those explained with reference to FIGS. 1 through 2C. So, by labeling them with common reference numerals, detailed explanation thereof is omitted.

In the structure shown in FIG. 8, electrons flow while repeating specular reflection between the non-metal layer 24 and the non-metal layer 50. Usable as material of the antiferromagnetic layer 10 are IrMn, PtMn, NiMn, FeMn, and so on, for example. Particularly when a metal exhibiting antiferromagnetism is used, it is possible to obtain a good pinning property having a high blocking temperature and a large unidirectional anisotropy.

Usable as material of the non-metal layer 24 are NiO, CoO, $Fe_3O_4$, $Fe_2O_3$, and so on, for example. Particularly when selecting a material exhibiting antiferromagnetism as material of the non-metal layer 24, good electron reflection effect can be obtained without adversely affecting the good pinning property the metal antiferromagnetic material has.

In the structure of FIG. 8, the non-metal layer 24 is preferably antiferromagnetic or ferromagnetic in order to obtain a good bias effect. When an antiferromagnetic material is used as the non-metal layer 24, its thickness is preferably not larger than 5 nm, and a bias property still more excellent in temperature characteristic can be obtained by limiting the thickness to the range not larger than 2 nm.

Also when a ferromagnetic material is used as the non-metal layer 24, its thickness is preferably not larger than 5 nm, and more preferably not larger than 2 nm to obtain a bias property still more excellent in temperature characteristic.

On the other hand, the non-metal layer for specular-reflecting electrons may be made in the middle of the ferromagnetic layer as shown in FIG. 9. In the structure shown in FIG. 9, a first antiferromagnetic layer 10A, non-metal layer 24, second antiferromagnetic layer 10B, first magnetic film 20, non-magnetic spacer film 30, second magnetic film 40 and non-metal layer 50 are stacked in this order on a substrate. Here again, structures and roles of individual layers may be substantially the same as those explained with reference to FIGS. 1 through 2C. So, by labeling them with common reference numerals, detailed explanation thereof is omitted.

By inserting the non-metal layer 24 for specular reflection of electrons in the middle of the antiferromagnetic layer 10 in this manner, the antiferromagnetic material and the ferromagnetic material can be stacked directly, and while realizing a better pinning property because of direct exchange coupling, an increase in MR by the specular reflection effect can be ensured.

Usable as materials of the antiferromagnetic layers 10A and 10B are IrMn, PtMn, NiMn and FeMn, for example. Especially, by using a metallic material, a good pinning property having a high blocking temperature and a large unidirectional anisotropy can be obtained.

Usable as material of the non-metal layer 24 are NiO, CoO, $Fe_3O_4$ and $Fe_2O_3$, for example, and its thickness is preferably not larger than 3 nm. Although the first antiferromagnetic layer 10A may be thicker than the non-metal layer 24, it is preferably not thicker than 10 nm to prevent the shunt effect of the current. If a sufficient bias effect is already obtained, the first antiferromagnetic layer 10A may be omitted.

A plurality of the pinned layer may be provided.

FIG. 10 is an outline diagram showing a structure including upper and lower pinned layers. In the structure shown here, a buffer layer 2, antiferromagnetic layer 10, first magnetic film 20, non-magnetic spacer film 30, second magnetic film 40, non-magnetic spacer film 30, first magnetic film 20, antiferromagnetic layer 10 and protection layer 60 are stacked in this order on a substrate. That is, in a central portion of the multi-layered structure, the second magnetic film 40 as the free layer is formed, and spacer films 30, pinned layers 20 and others are formed in a vertical symmetry. Here again, structures and roles of individual layers may be substantially the same as those explained with reference to FIGS. 1 through 2C. So, by labeling them with common reference numerals, detailed explanation thereof is omitted.

Each of the multi-layered structures shown in FIGS. 1 through 9 can also be applied to the example shown in FIG. 10. That is, the multi-layered structures already explained with reference to FIGS. 1 to 9 can be respectively provided in vertical symmetry above and below the second magnetic film 40.

In this manner by providing magnetic layers 20 as pinned layers on and under the magnetic layer 40 as the free layer, there is obtained the effect that large MR changing rate can be obtained even with a somewhat low reflectivity, in addition to the various effects already indicated with reference to FIGS. 1 to 9. Moreover, since the free layer is located near the center of the current path, there is obtained a still further effect that the operation is stable with less influences to the free layer from the current magnetic field.

On the other hand, if pinned layers are provided on and under the free layer in this manner, static magnetic coupling from the pinned layers is twice that of a structure having a single pinned layer. Therefore, because anti-parallel magnetization is made inside the pinned layers, the use of a so-called "synthetic antiferromagnetic structure" is more important.

FIG. 11 is a cross-sectional outline diagram showing a modified example which employs such a synthetic antiferromagnetic structure. In FIG. 11, each first magnetic film as the pinned layer has a structure in which a first ferromagnetic metal layer 22A, ruthenium (Ru) layer 28, second ferromagnetic metal layer 22B, non-metal layer 24 and third ferromagnetic metal layer 22C are stacked sequentially. With the ruthenium (Ru) layer 28 in this manner, magnetized directions of the upper and lower ferromagnetic layers become anti-parallel. That is, magnetized directions of the second ferromagnetic metal layer 22B and the third ferromagnetic metal layer 22C become anti-parallel with respect to the magnetized direction of the first ferromagnetic metal layer 22A. Therefore, if the total thickness of the layer 22B and the layer 22C is determined to be equal to the thickness of the layer 22A, magnetized directions are cancelled as a whole within the first magnetic film 20, and static coupling from pinned layers can be removed.

Additionally, in the structure of FIG. 11, by providing the non-metal layers 24, specular effect having electrons specular-reflected can be obtained simultaneously. That is, electrons flow between two non-metal layers 24 provided on and under the free layer, namely, second magnetic film 40, while being reflected thereby. Therefore, momentum loss of electrons is reduced, a sufficient sensitivity is ensured even when the second magnetic film 40 as the free layer is as thin as 2 nm or less, and still larger MR effect can be obtained.

Moreover, in the structure of FIG. 11, each non-metal layer 24 is interposed between the ruthenium layer 28 and the second magnetic film 40. This is because the ruthenium layer 28 has the property of scattering electrons. That is, if the ruthenium layer is provided in the main path of the current, it scatters electrons and causes a loss. In the structure of FIG. 11, however, by inserting the non-metal layer 24 between the ruthenium layer 28 and the second magnetic film 40 to locate the ruthenium layer 28 outside the current path, a loss by electron scattering can be prevented.

Next explained is a magnetic recording apparatus according to the invention.

Any of the MR elements according to the above-explained embodiments is incorporated in a magnetic head of a recording/reproducing integral type, for example, which is mounted in a magnetic recording apparatus.

FIG. 12 is a fragmentary perspective view showing an outline structure of a magnetic recording apparatus of this type. The magnetic recording apparatus 150 according to the invention is an apparatus of a type using a rotary actuator. In FIG. 11, a magnetic disc 151 is set on a spindle 152 and rotated by a motor, not shown, which is responsive to a control signal from a drive apparatus controller, not shown. A head slider 153 is attached to one end of a thin-film shaped suspension 154, which is held in a floating status from the magnetic disc 151. The head slider 153 includes a MR element according to any of the foregoing embodiments as a part of its magnetic head for recording or reproducing information.

When the magnetic disc 151 rotates, a surface (air bearing surface) of the head slider 153 opposed to the medium is held above the surface of the magnetic disc 151 by a predetermined floating amount.

The suspension 154 is connected to one end of an actuator arm 155 having a bobbin portion for holding a driving coil, not shown. Mounted at the other end of the actuator arm 155 is a voice coil motor 156 which is a kind of linear motor. The voice coil motor 156 is made up of a driving coil, not shown, wound up on the bobbin of the actuator arm 155, and a magnetic circuit made of a permanent magnet and opposed yokes which are positioned to sandwich the coil from opposite directions.

The actuator arm 155 is held by ball bearings, not shown, which are provided at upper and lower two positions of a fixed shaft 157 to be rotated or slidably moved by the voice coil motor 156.

According to the invention, by using any of the MR elements according to the foregoing embodiments as a major part of the magnetic head, large reproduced output signals and good thermal stability are ensured. As a result of it, changes with time of the reproduction outputs can be prevented as well. Moreover, resistance to ESD (electrostatic discharge) possibly applied during assemblage is also improved, and the assembling yield is improved as well.

These effects enable to make narrower tracks and decrease By the height of elements, and contributes to realization of a magnetic recording apparatus available for high-density magnetic recording.

Heretofore, some embodiments of the invention have been explained.

Next explained are some specific examples.

EXAMPLE 1

Referring to FIGS. 1 and 2, the first example of the invention is explained. First made was a multi-layered structure of Ta(5 nm)/NiFe(2 nm)/IrMn(5 nm)/NiFe(1 nm)/CoFe(0.5 nm) on a thermally oxidized silicon (Si) substrate by sputtering, and its surface was exposed to oxygen controlled in $1 \times 10^{-4}$ torr for 60 seconds to form the non-metal layer 24. Further formed thereon was a multi-layered structure of CoFe(2 nm)/Cu(2 nm)/CoFe(2 nm), and its surface was exposed to oxygen controlled in $1 \times 10^{-4}$ torr for 60 seconds to form the non-metal layer 50. Then, after stacking 0.4 nm thick Ta (tantalum) as a protective film, the product was taken out into the atmospheric air. As a result, Ta on the surface was also oxidized, and an oxide layer was formed. Thus, a multi-layered structure:

Ta(5 nm)/NiFe(2 nm)/IrMn(5 nm)/NiFe(0.6 nm)/NiFeo (0.4 nm)/CoFeO (0.5 nm)/CoFe(2 nm)/Cu(2 nm)/CoFe (1.6 nm)/CoFeo(0.4 nm)/TaO(0.4 nm)

was obtained. Since NiFe difficult to oxidize was sandwiched between the IrMn layer and the CoFe layer, thickness of the non-metal layer 24 was limited to 1 nm. That is, a very thin non-metal layer could be made with a good reproducibility.

Therefore, magnetic coupling in the pinned layer 20 via the non-metal layer 24 was sufficiently strong, and the spin valve structure excellent in pinning property could be realized. More specifically, MR changing rate of 18% and unidirectional anisotropic magnetic field ($H_{UA}$) of 400 Oe were obtained. Also in an example executing oxidation under 200° C. for making the non-metal layer 24 for the purpose of improving the entire crystalline property, no deterioration in pinning property was observed in the pinned layer 20.

COMPARATIVE EXAMPLE 1

For the purpose of comparison with Example 1 shown above, a multi-layered structure of Ta(5 nm)/NiFe(2 nm)/

IrMn(5 nm)/CoFe(2.0 nm) was stacked on a thermally oxidized silicon (Si) substrate by sputtering, and its surface was exposed to oxygen controlled in $1\times10^{-4}$ torr for 60 seconds to form a non-metal layer. Further stacked thereon was a multi-layered structure of CoFe(2 nm)/Cu(2 nm)/CoFe(2 nm), and its surface was exposed to oxygen controlled in $1\times10^{-4}$ torr for 60 seconds to form a non-metal layer. Then, after stacking 0.4 nm thick Ta thereon as a protective film, the product was taken out into the atmospheric air. As a result, Ta on the surface was also oxidized, and an oxide layer was made. Thus, a multi-layered structure of Ta(5 nm)/NiFe(2 nm)/IrMn(5 nm)/CoFe(0.5 nm)/CoFeO (1.5 nm)/CoFe (2 nm)/Cu(2 nm)/CoFe(1.6 nm)/CoFeO (0.4 nm)/TaO(0.4 nm)

was obtained. That is, in this comparative example, oxidation of CoFe progressed too much, and thickness of the CoFeO layer obtained was as thick as 1.5 nm. Therefore, magnetic coupling in the pinned layer via the CoFe layer was weak, and deterioration of the pinning property was observed. More specifically, $H_{UA}$ decreased to 200 Oe. Additionally, for the purpose of improving the entire crystalline property, oxidation for making a non-metal layer was conducted at 200° C. As a result, the pinning property of the pinned layer further degraded, and a further increase of the thickness of the non-metal layer by oxidation was confirmed.

EXAMPLE 2

Referring to FIG. 3, the second example of the invention is explained. First, a multi-layered structure of Ta(5 nm)/NiFe(2 nm)/IrMn(5 nm)/CoFe(1 nm)/Ni(1 nm) was stacked on a thermally oxidized silicon (Si) substrate by sputtering, and its surface was exposed to oxygen controlled in $1\times10^{-4}$ torr for 60 seconds to form the non-metal layer 24. Further stacked thereon was a multi-layered structure of CoFe(2 nm)/Cu(2 nm)/CoFe(2 nm), and its surface was exposed to oxygen controlled in $1\times10^{-4}$ torr for 60 seconds to form the non-metal layer 50. Then, after stacking 0.4 nm thick Ta thereon as a protective film, the product was taken out to the atmospheric air. As a result, Ta on the surface was also oxidized, an oxide was formed. Thus, a multi-layered structure of Ta(5 nm)/NiFe(2 nm)/IrMn(5 nm)/CoFe(1 nm)/Ni(0.5 nm)/NiO (0.5 nm)/CoFe(2 nm)/Cu(2 nm)/CoFe(1.6 nm)/CoFeO(0.4 nm)/TaO(0.4 nm)

was obtained.

In this example, since the Ni layer difficult to oxidize was formed on the surface and the CoFe layer was inserted in the layer in contact with the IrMn layer, thickness of the non-metal layer 24 was limited to 1 nm. That is, a very thin non-metal layer could be made with a good reproducibility.

Therefore, magnetic coupling in the pinned layer 20 via the non-metal layer 24 was sufficiently strong, and the spin valve structure excellent in pinning property could be realized. Further, by combining the IrMn layer and the CoFe layer, sufficiently strong unidirectional anisotropy was obtained. More specifically, MR changing rate of 17% and unidirectional anisotropic magnetic field of 550 Oe were obtained. Also in an example directed to further improvement of the entire crystalline property by executing oxidation for making the non-metal layer 24 at 200° C., no particular deterioration in pinning property was found in the pinned layer 20.

EXAMPLE 3

Referring to FIG. 4, the third example of the invention is explained. First, a multi-layered structure of Ta(5 nm)/NiFe(2 nm)/IrMn(5 nm)/CoFe(1 nm) was stacked on a thermally oxidized silicon (Si) substrate by sputtering, and its surface was exposed to oxygen controlled in $1\times10^{-5}$ torr for 10 seconds to form the first non-metal layer 24A. Further stacked thereon was 1 nm thick CoFe, and its surface was again exposed to oxygen controlled in $1\times10^{-5}$ torr for 10 seconds to form the second non-metal layer 24B.

Further stacked thereon was a multi-layered structure of CoFe(2 nm)/Cu(2 nm)/Cofe(2 nm), and its surface was exposed to oxygen controlled in $1\times10^{-4}$ torr for 60 seconds to form the non-metal layer 50. Thereafter, 0.4 nm thick Ta was stacked as a protective layer, and the product was taken out to the atmospheric air. As a result, Ta on the surface was also oxidized, and an oxide film was formed. Thus, a multi-layered structure of Ta(5 nm)/NiFe(2 nm)/IrMn(5 nm)/CoFe(0.7 nm)/CoFeO (0.3 nm)/CoFe (0.7 nm)/CoFeO(0.3 nm)/CoFe(2 nm)/ Cu(2 nm)/CoFe(1.6 nm)/CoFeO (0.4 nm)TaO(0.4 nm)

was obtained.

In this example, very thin CoFeO layers 24A and 24B thin enough to enable formation of pin holes due to weak oxidation are made. By making two non-metal layers in this manner, the entire specular reflectivity of electrons could be improved, and MR effect as large as approximately 18% could be obtained.

EXAMPLE 4

The fourth example of the invention is explained with reference to FIG. 5. First, a multi-layered structure of Ta(5 nm)/NiFe(2 nm)/IrMn(5 nm)/CoFeCr(2 nm was stacked on a thermally oxidized silicon (Si) substrate by sputtering, and its surface was exposed to oxygen controlled in $1\times10^{-4}$ torr for 60 seconds to form the non-metal layer 24. Further stacked thereon was a multi-layered structure of CoFe(2 nm)/Cu(2 nm)/CoFe(2 nm), and its surface was exposed to oxygen controlled in $1\times10^{-4}$ torr for 60 seconds to obtain the non-metal layer 50. Then, after stacking 0.4 nm thick Ta thereon as a protective film, the product was taken out to the atmospheric air. As a result, Ta on the surface was also oxidized, and an oxide layer was formed. Thus, a multi-layered structure of Ta(5 nm)/NiFe(2 nm)/IrMn(5 nm)/CoFeCr(1.2 nm)/ CoFeCrO (0.8 nm)/CoFe(2 nm)/Cu(2 nm)/CoFe(1.6 nm)/CoFeO(0.4 nm)/TaO(0.4 nm)

was obtained.

In this example, since Cr was selectively oxidized to form a stable oxide, a very thin non-metal layer 24 could be made with a good reproducibility. Moreover, since the entire crystalline property was improved, also in an example executing oxidation for making the non-metal layer 24 at 200° C., no particular deterioration in pinning property was observed in the pinned layer 20.

EXAMPLE 5

Referring to FIG. 6, the fifth example of the invention is explained. First, a multi-layered structure of Ta(5 nm)/NiFe(2 nm)/IrMn(5 nm)/CoFe(0.5 nm)/Cr(0.4 nm) was stacked by sputtering on a thermally oxidized silicon (Si) substrate, and its surface was exposed to oxygen controlled in $1\times10^{-5}$ torr for 10 seconds to form the first non-metal layer 24'.

Further stacked thereon was a multi-layered structure of CoFe(2 nm)/Cu(2 nm)/CoFe(2 nm), and its surface was again exposed to oxygen controlled in $1\times10^{-4}$ torr to form the second non-metal layer 50. Thereafter, 0.4 nm thick Ta (tantalum) was stacked as a protective layer, and the product was taken out to the atmospheric air. As a result, Ta on the surface was also oxidized, and an oxide film was formed. Thus, a multi-layered structure of Ta(5 nm)/NiFe(2 nm)/IrMn(5 nm)/CoFe(0.5 nm)/Cr$_2$O$_3$ (0.5 nm)/CoFe (2 nm)/Cu(2 nm)/CoFe(1.6 nm)/CoFeO (0.4 nm)TaO(0.4 nm)

was obtained.

In this example, the whole layers has (111)-oriented structure, the CoFe layers showed fcc (face centered cubic) structure and (111)-plane stacking structure. The Cr$_2$O$_3$ layer showed corundum structure with the closest packed atomic plane aligned substantially in parallel to the film surface. In the case of corundum structure, Cr (chromium) atomic layers are antiferromagnetically coupled each other across oxygen atomic layer and the magnetic period is 0.452 nm. Therefore, by adjusting the thickness of the Cr$_2$O$_3$ layer to be about 0.5 nm, two oxygen atomic layers are stacked along the thickness direction. As a result, the upper and lower CoFe layers sandwiching the Cr$_2$O$_3$ layer shows a parallel magnetic coupling which yields about an improved stability of the magnetic properties. More specifically, MR effect as large as approximately 20% and the unidirectional magnetic anisotropy (H$_{UA}$) as large as 600 Oe could be obtained.

EXAMPLE 6

Referring to FIG. 6 again, the sixth example of the invention is explained. First, a multi-layered structure of Ta(5 nm)/NiFe(2 nm)/IrMn(5 nm)/CoFe(2 nm)/Cr(0.6 nm) was stacked by sputtering on a thermally oxidized silicon (Si) substrate, and its surface was exposed to oxygen controlled in 1×10$^{-5}$ torr for 10 seconds to form the first non-metal layer 24'.

Further stacked thereon was a multi-layered structure of CoFe(2 nm)/Cu(2 nm)/CoFe(2 nm), and its surface was again exposed to oxygen controlled in 1×10$^{-4}$ torr to form the second non-metal layer 50. Thereafter, 0.4 nm thick Ta (tantalum) was stacked as a protective layer, and the product was taken out to the atmospheric air. As a result, Ta on the surface was also oxidized, and an oxide film was formed. Thus, a multi-layered structure of Ta(5 nm)/NiFe(2 nm)/IrMn(5 nm)/CoFe(2 nm)/Cr$_2$O$_3$(0.7 nm)/CoFe (2 nm)/Cu(2 nm)/CoFe(1.6 nm)/CoFeO(0.4 nm)TaO(0.4 nm)

was obtained.

In this example, the whole layers also has (111)-oriented structure, the CoFe layers showed fcc (face centered cubic) structure and (111)-plane stacking structure. The Cr$_2$O$_3$ layer also showed corundum structure with the closest packed atomic plane aligned substantially in parallel to the film surface. In the case of corundum structure, Cr (chromium) atomic layers are antiferromagnetically coupled each other across oxygen atomic layer and the magnetic period is 0.452 nm. Therefore, by adjusting the thickness of the Cr$_2$O$_3$ layer to be about 0.7 nm, three oxygen atomic layers are stacked along the thickness direction. As a result, the upper and lower CoFe layers sandwiching the Cr$_2$O$_3$ layer shows a anti-parallel magnetic coupling which yields about a synthetic antiferromagnetic arrangement. More specifically, MR effect as large as approximately 19% could be obtained.

EXAMPLE 7

Referring to FIG. 6 one more time, the seventh example of the invention is explained. First, a multi-layered structure of Ta(5 nm)/NiFe(2 nm)/IrMn(5 nm)/CoFe(0.5 nm)/Fe(0.4 nm) was stacked by sputtering on a thermally oxidized silicon (Si) substrate, and its surface was exposed to oxygen controlled in 1×10$^{-5}$ torr for 10 seconds to form the first non-metal layer 24'.

Further stacked thereon was a multi-layered structure of CoFe(2 nm)/Cu(2 nm)/CoFe(2 nm), and its surface was again exposed to oxygen controlled in 1×10$^{-4}$ torr to form the second non-metal layer 50. Thereafter, 0.4 nm thick Ta (tantalum) was stacked as a protective layer, and the product was taken out to the atmospheric air. As a result, Ta on the surface was also oxidized, and an oxide film was formed. Thus, a multi-layered structure of Ta(5 nm)/NiFe(2 nm)/IrMn(5 nm)/CoFe(0.5 nm)/α-Fe$_2$O$_3$(0.5 nm)/CoFe (2 nm)/Cu(2 nm)/CoFe(1.6 nm)/CoFeO(0.4 nm)/TaO(0.4 nm)

was obtained.

In this example, the whole layers has (111)-oriented structure, the CoFe layers showed fcc (face centered cubic) structure and (111)-plane stacking structure. The α-Fe$_2$O$_3$ layer showed corundum structure with the closest packed atomic plane aligned substantially in parallel to the film surface. In the case of this corundum structure, Fe (iron) atomic layers are antiferromagnetically coupled each other across oxygen atomic layer and the magnetic period is 0.458 nm. Therefore, by adjusting the thickness of the α-Fe$_2$O$_3$ layer to be about 0.5 nm, two oxygen atomic layers are stacked along the thickness direction. As a result, the upper and lower CoFe layers sandwiching the α-Fe$_2$O$_3$ layer shows a parallel magnetic coupling which yields about an improved stability of the magnetic properties. More specifically, MR effect as large as approximately 20% and the unidirectional magnetic anisotropy (H$_{UA}$) as large as 600 Oe could be obtained. Further, since α-Fe$_2$O$_3$ has a Neel temperature (the temperature at which the antiferromagnetism disappears) as high as 670° C., the unidirectional magnetic anisotropy (H$_{UA}$) as large as 600 Oe could be kept even at 100° C. which is the actual operation temperature of the MR element in the field.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No.H10-377385 filed on Dec. 28, 1998 including specification, claims, drawings and summary is incorporated herein by reference in its entirety.

What is claimed is:

1. A magnetoresistive element having a spin valve structure comprising a first magnetic film, a second magnetic film, and a non-magnetic spacer film interposed between said first magnetic film and said second magnetic film;

one of said first and second magnetic films including a first ferromagnetic metal layer; a first non-metal layer provided on said first ferromagnetic metal layer; a second non-metal layer provided on said first non-metal layer and different in composition from said first non-metal layer; and a second ferromagnetic metal layer provided on said second non-metal layer;

said first and second non-metal layers being an electron reflecting layer.

2. A magnetoresistive element having a spin valve structure comprising a first magnetic film, a second magnetic film, and a non-magnetic spacer film interposed between said first magnetic film and said second magnetic film;

one of said first and second magnetic films including a first ferromagnetic metal layer; a second ferromagnetic metal layer provided on said first ferromagnetic metal layer and different in composition from said first ferromagnetic metal layer; a non-metal layer provided on said second ferromagnetic metal layer; and a third ferromagnetic metal layer provided on said non-metal layer;

said non-metal layer being an electron reflecting layer.

3. A magnetoresistive element having a spin valve structure comprising a first magnetic film, a second magnetic film, and a non-magnetic spacer film interposed between said first magnetic film and said second magnetic film;

one of said first and second magnetic films including a first ferromagnetic metal layer; a first non-metal layer provided on said first ferromagnetic metal layer; a second ferromagnetic metal layer provided on said first non-metal layer; a second non-metal layer provided on said second ferromagnetic metal layer; and a third ferromagnetic metal layer provided on said second non-metal layer;

said first and second non-metal layers being an electron reflecting layer.

4. A magnetoresistive element having a spin valve structure comprising a first magnetic film, a second magnetic film, and a non-magnetic spacer film interposed between said first magnetic film and said second magnetic film;

one of said first and second magnetic films including: a first ferromagnetic metal layer containing at least one element selected from the group consisting of lithium (Li), beryllium (Be), sodium (Na), magnesium (Mg), aluminum (Al), silicon (Si), phosphorus (P), potassium (K), calcium (Ca), scandium (Sc), gallium (Ga), rubidium (Rb), strontium (Sr), yttrium (Y), cesium (Cs), barium (Ba) and elements belonging to the lanthanide series by not less than 1%, a non-metal layer formed on said first ferromagnetic metal layer; and a second ferromagnetic metal layer formed on said non-metal layer;

said non-metal layer being an electron reflecting layer.

5. The magnetoresistive element according to claim 4, wherein said first ferromagnetic metal layer contains at least one element selected from the groups consisting of aluminum (Al), silicon (Si) and elements belonging to the lanthanide series by not less than 1%.

6. A magnetoresistive element having a spin valve structure which includes a first magnetic film, a second magnetic film, and a non-magnetic spacer film interposed between said first magnetic film and said second magnetic film, wherein:

one of said first and said second magnetic films includes a first ferromagnetic metal layer, a non-metal layer provided on said first ferromagnetic metal layer, and a second ferromagnetic metal layer provided on said non-metal layer, said non-metal layer being made of an antiferromagnetic material which satisfies the equation:

$$P \times (n+0.3) \leq T \leq P \times (n+0.7)$$

where T is the thickness of said non-metal layer, P is the magnetic period thereof, and n is an integer.

7. A magnetoresistive element having a spin valve structure which includes a first magnetic film, a second magnetic film, and a non-magnetic spacer film interposed between said first magnetic film and said second magnetic film, wherein:

one of said first and said second magnetic films includes a first ferromagnetic metal layer, a non-metal layer provided on said first ferromagnetic metal layer, and a second ferromagnetic metal layer provided on said non-metal layer, said non-metal layer being made of an antiferromagnetic material which satisfies the equation:

$$P \times (n-0.2) \leq T \leq P \times (n+0.2)$$

where T is the thickness of said non-metal layer, P is the magnetic period thereof, and n is an integer.

8. A magnetic recording apparatus having a magnetic head for recording or reproducing information on or form a magnetic recording medium, characterized in that said magnetic head includes a magnetoresistive element, said magnetoresistive element having a spin valve structure comprising a first magnetic film, a second magnetic film, and an non-magnetic spacer film interposed between said first magnetic film and said second magnetic film, one of said first and second magnetic films including a first ferromagnetic metal layer; a first non-metal layer provided on said first ferromagnetic metal layer; a second non-metal layer provided on said first non-metal layer and different in composition from said first non-metal layer; and a second ferromagnetic metal layer provided on said second non-metal layer;

said first and second non-metal layers being an electron reflecting layer.

9. The magnetoresistive element according to claim 1, wherein said non-magnetic spacer film contains at least one selected from oxides, nitrides, and fluorides.

10. The magnetoresistive element according to claim 1, wherein a total thickness of said first and second non-metal layers is not larger than 3 nm.

11. The magnetoresistive element according to claim 1, wherein one of said first and second non-metal layers, which is remoter from said non-magnetic spacer film, includes a material containing at least nickel.

12. The magnetoresistive element according to claim 2, wherein said non-magnetic spacer film contains at least one selected from oxides, nitrides and fluorides.

13. The magnetoresistive element according to claim 2, wherein one of said first and second ferromagnetic metal layers, which is remoter from said non-magnetic spacer film, contains nickel alloy.

14. The magnetoresistive element according to claim 3, wherein said non-magnetic spacer film contains at least one selected from oxides, nitrides, and fluorides.

15. The magnetoresistive element according to claim 3, wherein said non-magnetic spacer film has an area of pin holes which is not larger than half of the area of the entirety.

16. The magnetoresistive element according to claim 4, wherein said non-magnetic spacer film contains at least one selected from oxides, nitrides, and fluorides.

17. The magnetoresistive element according to claim 6, wherein said non-magnetic spacer film is made of an antiferromagnetic material, and includes first and second magnetic atomic layers having a magnetization of an antiferromagnetic orientation respectively, and third magnetic layer interposed between said first and second magnetic atomic layers and having a magnetization of a ferromagnetic orientation, and an atomic surface of said third magnetic atomic layer is substantially parallel with the surface of said non-magnetic spacer film.

18. The magnetoresistive element according to claim 6, wherein said non-magnetic spacer film contains at least one selected from NiO, CoO, and $Fe_2O_3$.

19. The magnetoresistive element according to claim 7, wherein said non-magnetic spacer film is made of an anti-ferromagnetic material, and includes first and second magnetic atomic layers having a magnetization of an anti-ferromagnetic orientation respectively, and third magnetic layer interposed between said first and second magnetic atomic layers and having a magnetization of a ferromagnetic orientation, and an atomic surface of said third magnetic atomic layer is substantially parallel with the surface of said non-magnetic spacer film.

20. The magnetoresistive element according to claim 7, wherein said non-magnetic spacer film contains at least one selected from NiO, CoO, and $Fe_2O_3$.

* * * * *

UNITED STATES PATENT AND TRADEMARK OFFICE
CERTIFICATE OF CORRECTION

PATENT NO. : 6,348,274 B1  Page 1 of 1
DATED : February 19, 2002
INVENTOR(S) : Yuzo Kamiguchi et al.

It is certified that error appears in the above-identified patent and that said Letters Patent is hereby corrected as shown below:

Column 24,
Line 16, change "form" to -- from --; and
Line 22, change "an non-magnetic" to -- a non-magnetic --.

Signed and Sealed this

Fourth Day of June, 2002

*Attest:*

*Attesting Officer*

JAMES E. ROGAN
*Director of the United States Patent and Trademark Office*